United States Patent
Phillips et al.

(10) Patent No.: US 8,707,363 B2
(45) Date of Patent: Apr. 22, 2014

(54) SYNCHRONIZATION GUIDES FOR GROUP VIDEO WATCHING

(75) Inventors: Andrew V. Phillips, Raleigh, NC (US); Scott Curtis, Durham, NC (US)

(73) Assignee: Eloy Technology, LLC, Wilmington, DE (US)

( * ) Notice: Subject to any disclaimer, the term of this patent is extended or adjusted under 35 U.S.C. 154(b) by 576 days.

(21) Appl. No.: 12/976,358

(22) Filed: Dec. 22, 2010

(65) Prior Publication Data

US 2012/0117017 A1 May 10, 2012

Related U.S. Application Data

(60) Provisional application No. 61/289,124, filed on Dec. 22, 2009.

(51) Int. Cl.
*G06F 3/00* (2006.01)

(52) U.S. Cl.
USPC .......................................................... 725/46

(58) Field of Classification Search
None
See application file for complete search history.

(56) References Cited

U.S. PATENT DOCUMENTS

| | | | |
|---|---|---|---|
| 2003/0093793 A1* | 5/2003 | Gutta | 725/46 |
| 2006/0282856 A1* | 12/2006 | Errico et al. | 725/46 |
| 2009/0178081 A1* | 7/2009 | Goldenberg et al. | 725/46 |
| 2009/0210898 A1* | 8/2009 | Childress et al. | 725/34 |
| 2009/0265742 A1* | 10/2009 | Schwartz et al. | 725/46 |
| 2009/0328105 A1* | 12/2009 | Craner et al. | 725/46 |
| 2010/0169927 A1* | 7/2010 | Yamaoka et al. | 725/46 |
| 2010/0186041 A1* | 7/2010 | Chu et al. | 725/46 |

* cited by examiner

*Primary Examiner* — Jason K Lin

(57) ABSTRACT

Systems and methods are disclosed for recommending items in a video series to a group of viewers. In general, video series item recommendations are generated for a viewer group detected within a viewing area of a media device based on personal viewing histories of users in the viewer group. In one embodiment, the video series item recommendations are recommendations for video series items that: (a) are from one or more video series historically viewed by at least a first predefined minimum threshold number of users in the viewer group and (b) have not yet been viewed by any of at least a second predefined minimum threshold number of users in the viewer group. The video series item recommendations are then provided to the viewer group.

39 Claims, 11 Drawing Sheets

SYNCHRONIZATION GUIDES FOR GROUP VIDEO WATCHING

RELATED APPLICATIONS

This application claims the benefit of provisional patent application Ser. No. 61/289,124, filed Dec. 22, 2009, the disclosure of which is hereby incorporated herein by reference in its entirety.

FIELD OF THE DISCLOSURE

The present disclosure relates to generating video series item recommendations for a viewer group.

BACKGROUND

Digital Video Recorders (DVRs) have become commonplace in today's homes. However, one issue encountered is that residents of a home often get out of sync with one another in watching recorded television series that they enjoy. For example, each person in a family may enjoy watching a particular television series. As such, a DVR in their home is configured to record episodes of the television series. However, in many cases, all of the members of the family do not sit down to watch the recorded episodes of the television series at the same time. In this manner, the members of the family may get out of sync with one another in watching the television series. For instance, one member may have watched all of the recorded episodes of the television series while another member may not have yet watched the two most recent recorded episodes of the television series. Thus, there is a need for a system and method that recommends video series items to users at a user premises (e.g., a family's home) in such a manner as to keep the users in sync with one another in the corresponding video series.

SUMMARY

Systems and methods are disclosed for recommending items in a video series to a group of viewers. In general, video series item recommendations are generated for a viewer group detected within a viewing area of a media device based on personal viewing histories of users in the viewer group. In one embodiment, the video series item recommendations are recommendations for video series items that: (a) are from one or more video series historically viewed by at least a first predefined minimum threshold number of users in the viewer group and (b) have not yet been viewed by any of at least a second predefined minimum threshold number of users in the viewer group. The video series item recommendations are then provided to the viewer group.

In one embodiment, the video series item recommendations include one or more video series item recommendations for one or more video series items recorded or otherwise stored by the media device. In another embodiment, the video series item recommendations include one or more video series item recommendations for one or more video series items available to the media device from one or more on-demand content sources. In another embodiment, the media device is located at a user premises and is connected to one or more other media devices also located at the user premises via a Local Area Network (LAN), and the video series item recommendations include one or more video series item recommendations for one or more video series items stored at the one or more other media devices and available to the media device from one or more other media devices via the LAN. In yet another embodiment, the media device is located at a user premises and is connected to one or more other media devices also located at the user premises via a LAN, and the video series item recommendations include one or more video series item recommendations for one or more video series items that are accessible to the one or more other media devices via one or more on-demand content sources and are available to the media device from one or more other media devices via the LAN.

In one embodiment, the one or more video series item recommendations are generated for the viewer group by first identifying, based on the personal viewing histories of the users in the viewer group, one or more video series that have historically been viewed by at least the first predefined minimum number of users in the viewer group and have video series items that have not been viewed by at least the second predefined minimum number of users in the viewer group. The video series items in the identified series that have not yet been viewed by at least the second predefined minimum number of users in the viewer group are then prioritized based on one or more criteria. More specifically, in one embodiment, each of the video series items is prioritized based on one or more criteria including: (1) a number of the users in the viewer group that have historically viewed the corresponding video series but have not already viewed the video series item, (2) a number of other users not in the viewer group that have historically viewed the corresponding video series at the same locale (e.g., at the same media device or at the same user premises at which the media device is located) but have not already viewed the video series item, (3) a number of other video series items following the video series item in the corresponding video series that have already been viewed by one or more other users not in the viewer group that have historically viewed the corresponding video series at the same locale, (4) a number of other video series items following the video series item in the corresponding video series that have already been viewed by all other users not in the viewer group that have historically viewed the corresponding video series at the same locale, (5) a number of other video series items preceding the video series item in the corresponding video series that have not already been viewed by one or more other users not in the viewer group that have historically viewed the corresponding video series at the same locale, or (6) a number of other video series items preceding the video series item in the corresponding video series that have not already been viewed by all other users not in the viewer group that have historically viewed the corresponding video series at the same locale. In one embodiment, the one or more video series item recommendations include video series item recommendations for all of the video series items in the identified series that have not yet been viewed by at least the second predefined minimum number of users in the viewer group, where the one or more video series item recommendations reflect the priorities of the corresponding video series items. In another embodiment, the one or more video series item recommendations include video series item recommendations for only those video series items that have priorities greater than a predefined threshold priority.

In one embodiment, the video series item recommendations are generated by a local recommendation engine of the media device. In another embodiment, the video series item recommendations are generated by one or more external recommendation engines. The one or more external recommendation engines may include, for example, a recommendation engine for a number of media devices, including the media device, located at a user premises and connected by a LAN, one or more remote recommendation engines associated with the one or more on-demand content sources, or both. In yet another embodiment, the video series item recommendations are generated by a local recommendation engine of the media device and one or more external recommendation engines.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
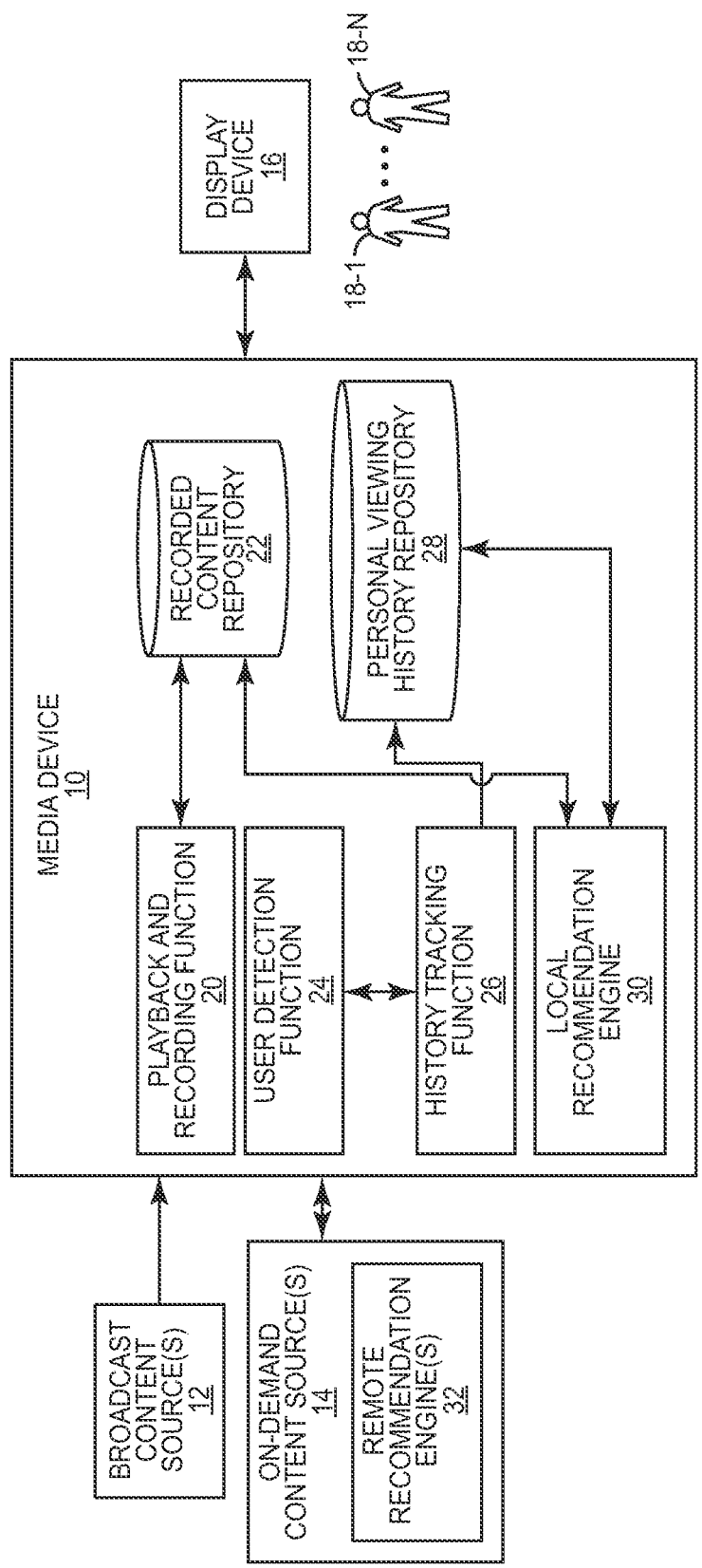
FIG. 1 illustrates a system in which video series item recommendations are generated according to one embodiment of the present disclosure.

FIG. 1 illustrates a media device 10 that operates to provide video series item recommendations to a viewer group within a viewing area of the media device 10 according to one embodiment of the present disclosure. The media device 10 is generally any device that provides playback of stored video series items and/or on-demand video series items. More specifically, in one embodiment, the media device 10 is a set-top box utilized to access video content from a cable or satellite television service provider. The set-top box may include Digital Video Recorder (DVR) functionality that enables the set-top box to record broadcast television content and, optionally, functionality that enables the set-top box to access on-demand content, which may be provided by an on-demand service of the television service provider and/or one or more other on-demand sources such as, for example, one or more Internet websites that stream video content on-demand. In another embodiment, the media device 10 is a personal computer having access to video series items stored by the personal computer such as, for example, video series items purchased from an Internet source such as the Apple® iTunes® store and stored by the personal computer and/or video series items available from one or more on-demand sources such as, for example, one or more Internet websites that stream video series items on-demand. In yet another embodiment, the media device 10 is a television that incorporates technology for recording or otherwise storing video series items and/or accessing video series items available from one or more on-demand sources. For example, the television may be a television that incorporates Google® TV. In yet another embodiment, the media device 10 may be an Apple TV® or similar device that operates to obtain and play video content from one or more media devices (e.g., personal computers) connected to the Apple TV® via a Local Area Network (LAN) and/or one or more on-demand content sources (e.g., Apple® iTunes® store, YouTube®, or Netflix® online). Note that the embodiments of the media device 10 described above are exemplary and do not limit the scope of the present disclosure. Additional devices that may be configured to operate as the media device 10 will be apparent to one of ordinary skill in the art upon reading this disclosure.

The media device 10 is enabled to access video content from one or more broadcast content sources 12 and one or more on-demand content sources 14. The one or more broadcast content sources 12 include, for example, one or more cable or satellite television service providers, one or more Internet sources that multicast or web-cast video content, or the like. The one or more on-demand content sources 14 include, for example, one or more cable or satellite television service providers that provide video on-demand, one or more Internet websites or sources that stream video content on-demand, or the like.

In addition, the media device 10 is enabled to output video content played by the media device 10 to a display device 16 such that the video content is presented to users 18-1 through 18-N that are within a viewing area of the display device 16, which is also referred to herein as a viewing area of the media device 10. The display device 16 may be, for example, a television, a monitor, a projector, or the like that is connected directly to the media device 10 via a wired connection (e.g., a High Definition Multimedia Interface (HDMI) connection) or connected indirectly to the media device 10 via an intermediate device (e.g., an A/V receiver) and corresponding wired connections from the media device 10 to the intermediate device and from the intermediate device to the display device 16. Note that while the display device 16 is separate from the media device 10 in this embodiment, in an alternative embodiment, the display device 16 may be part of the media device 10 (e.g., an embodiment where the media device 10 is an all-in-one computer such as, for example, an Apple® iMac®).

The media device 10 includes, in this embodiment, a playback and recording function 20, a recorded content repository 22, a user detection function 24, a history tracking function 26, a personal viewing history repository 28, and a local recommendation engine 30. The playback and recording function 20 may be implemented in hardware, software, or a combination of hardware and software. In general, the playback and recording function 20 operates to provide playback of video content from the one or more broadcast content sources 12 and the one or more on-demand content sources 14 and output the video content to the display device 16. In addition, the playback and recording function 20 provides a DVR feature by which the playback and recording function 20 records video content received from the one or more broadcast content sources 12 and stores the recorded video content in the recorded content repository 22. The video content played by and/or recorded by the playback and recording function 20 is preferably user selectable. For example, one or more of the users 18-1 through 18-N may interact with the media device 10 via a corresponding remote control device (not shown) to select video content to be played by the media device 10 and presented to the users 18-1 through 18-N via the display device 16 or to select video content to be recorded and stored in the recorded content repository 22.

The recorded content repository 22 stores both video items recorded by the media device 10 and metadata that describes the video items. In particular, for recorded video series items, the metadata for each recorded video series item includes information that identifies the corresponding video series and information that identifies the position of the video series item in the video series (e.g., the metadata may include information that identifies a video series item as season 2, episode 1 of the television series The Office). It should be noted that while the media device 10 is described herein as including the recorded content repository 22, in another embodiment, the media device 10 may store video content obtained in a manner other than recording. For example, the media device 10 may additionally or alternatively store purchased video content, rented video content, or leased video content (e.g., downloadable video content from a subscription-based service).

The user detection function 24 may be implemented in hardware, software, or a combination of hardware and software. In general, the user detection function 24 uses any suitable technology to detect the users 18-1 through 18-N located in a viewing area of the display device 16, which is also referred to herein as a viewing area of the media device 10. Notably, as used herein, detecting the users 18-1 through 18-N is not simply detecting that there are users in the viewing area, but rather detecting the identities of the users 18-1 through 18-N in the viewing area. In one exemplary embodiment, the user detection function 24 detects the users 18-1 through 18-N via facial recognition. More specifically, the user detection function 24 may include a camera or may be connected to an external camera that captures an image of any users in the viewing area of the media device 10, which in this case is an image of the users 18-1 through 18-N. The user detection function 24 may then utilize known facial recognition techniques to detect the users 18-1 through 18-N in the viewing area of the media device 10.

In another exemplary embodiment, the user detection function 24 detects the users 18-1 through 18-N via a wireless Personal Area Network (PAN) technology such as, for example, a power class 2 or 3 Bluetooth® transceiver (i.e., a Bluetooth® transceiver with a range of approximately 10 meters (m) or 1 m). More specifically, using wireless PAN technology, the user detection function 24 may detect mobile devices of the users 18-1 through 18-N within the wireless PAN range of a wireless PAN interface of the media device 10 or, alternatively, the display device 16. For instance, the user detection function 24 may detect the Bluetooth® identifiers (IDs) of Bluetooth®-enabled mobile devices of the users 18-1 through 18-N. The Bluetooth® IDs of the mobile devices of the users 18-1 through 18-N may be used as IDs of the users 18-1 through 18-N when tracking the personal viewing histories of the users 18-1 through 18-N. Alternatively, the Bluetooth® IDs may be correlated to other identifiers of the users 18-1 through 18-N (e.g., legal names or usernames) used for tracking the personal viewing histories of the users 18-1 through 18-N. In yet another exemplary embodiment, the user detection function 24 may enable one or more of the users 18-1 through 18-N to manually identify the users 18-1 through 18-N via, for example, a remote control of the media device 10. Note that the exemplary embodiments of the user detection function 24 are exemplary and are not intended to limit the scope of the present disclosure. Any suitable technology for detecting the users 18-1 through 18-N in the viewing area of the media device 10 may be used.

The history tracking function 26 may also be implemented in hardware, software, or a combination of hardware and software. In general, the history tracking function 26 creates and maintains personal viewing histories for individual users, including but not limited to the users 18-1 through 18-N, that view video content in the viewing area of the media device 10. More specifically, the history tracking function 26 obtains a list of users in the viewing area of the media device 10 from the user detection function 24, monitors video content played by the media device 10 for display via the display device 16, and stores information that identifies the video content items viewed by the users in the list of users in the viewing area in the personal viewing histories of those users maintained in the personal viewing history repository 28. The personal viewing history repository 28 includes a personal viewing history of each individual user that has been detected in the viewing area of the media device 10 and has viewed video content played by the media device 10 and displayed via the display device 16. Using the user 18-1 as an example, the personal viewing history of the user 18-1 includes information that identifies video items (e.g., video series items) viewed by the user 18-1. In addition, for each video item viewed by the user 18-1, the personal viewing history of the user 18-1 may include one or more timestamps that define, for example, a time and date at which the user 18-1 began viewing the video item and/or a time and date at which the user 18-1 completed viewing the video item.

The local recommendation engine 30 may also be implemented in hardware, software, or a combination of hardware and software. In general, the local recommendation engine 30 operates to generate video series item recommendations for the users 18-1 through 18-N in the viewing area of the media device 10. As discussed below, in this embodiment, the video series item recommendations are recommendations for one or more video series items stored in the recorded content repository 22 at the media device 10 and/or recommendations for one or more video series items available to the media device 10 from the one or more on-demand content sources 14. In the preferred embodiment, the video series item recommendations are optimized for the particular viewer group (i.e., the users 18-1 through 18-N) in the viewing area of the media device 10 such that the users 18-1 through 18-N do not get too far behind other users that typically watch the same video series in the viewing area of the media device 10 and/or such that the users 18-1 through 18-N do not get too far ahead of other users that typically watch the same video series in the viewing area of the media device 10.

Lastly, in some embodiments, the one or more on-demand content sources 14 include one or more corresponding remote recommendation engines 32. The one or more remote recommendation engines 32 may be implemented in hardware, software, or a combination of hardware and software. In general, each of the remote recommendation engines 32 operates to generate video series item recommendations for the users 18-1 through 18-N in the viewing area of the display device 16. Here, the video series item recommendations are recommendations for video series items available to the media device 10 via the one or more corresponding on-demand content sources 14. In the preferred embodiment, the video series item recommendations are optimized for the particular viewer group (i.e., the users 18-1 through 18-N) in the viewing area of the media device 10 such that the users 18-1 through 18-N do not get too far behind other users that typically watch the same video series in the viewing area of the media device 10 and/or such that the users 18-1 through 18-N do not get too far ahead of other users that typically watch the same video series in the viewing area of the media device 10. Notably, while the system of FIG. 1 includes both the local recommendation engine 30 and the one or more remote recommendation engines 32, it should be appreciated that the system may alternatively include the local recommendation engine 30 but not the one or more remote recommendation engines 32 or vice versa.

Figure 2:
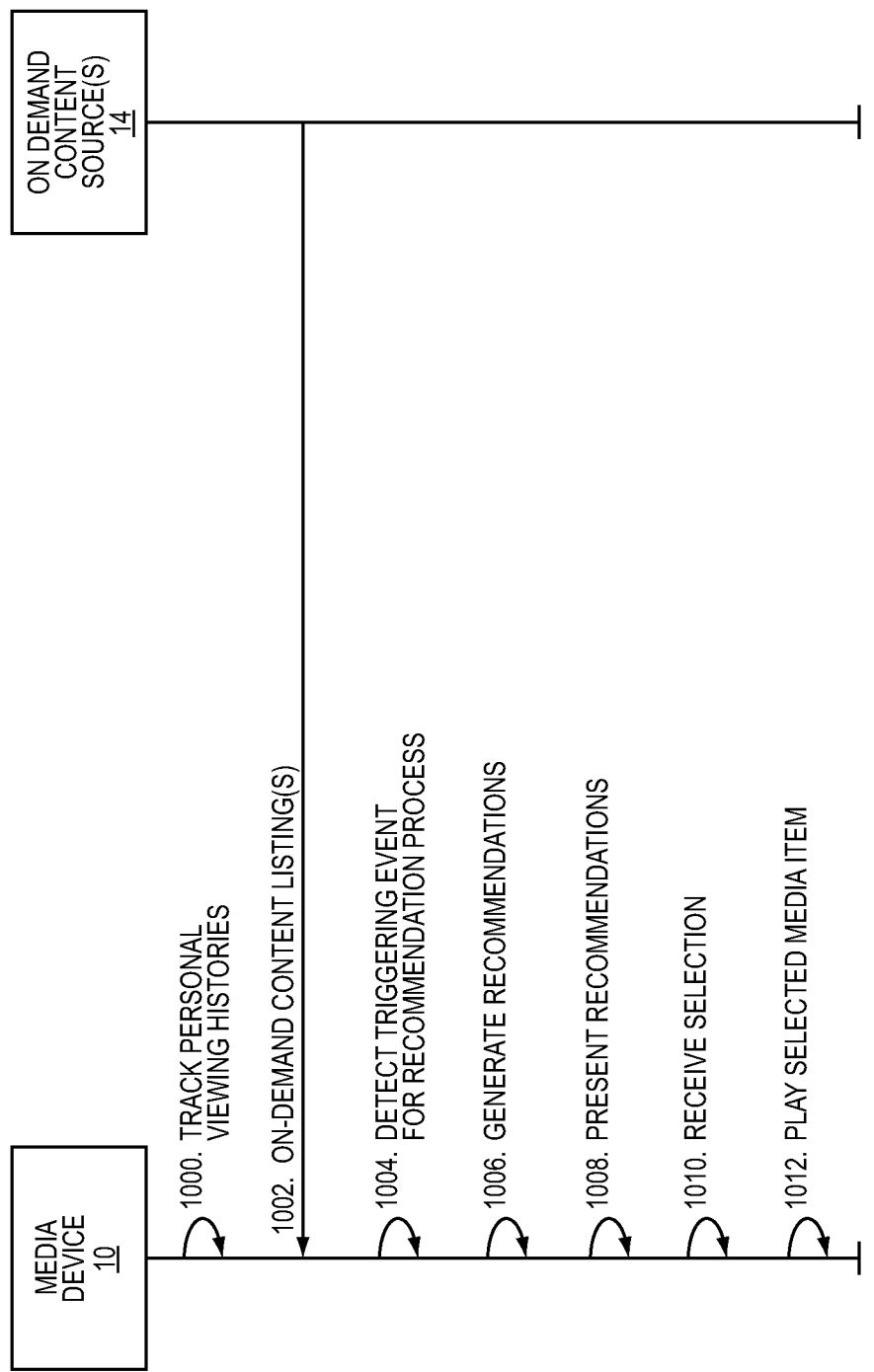
FIG. 2 illustrates the operation of the system of FIG. 1 according to one embodiment of the present disclosure.

FIG. 2 illustrates the operation of the system of FIG. 1 according to one embodiment of the present disclosure. First, the history tracking function 26 of the media device 10 tracks the personal viewing histories of users, including the users 18-1 through 18-N, that view video content played by the media device 10 and displayed via the display device 16 (step 1000). In general, the history tracking function 26 detects when a video item, such as but not limited to a video series item, is played by the media device 10 and displayed via the display device 16. In response, the history tracking function 26 updates the personal viewing histories of the users 18-1 through 18-N detected within the viewing area of the media device 10 to reflect that the users 18-1 through 18-N have viewed the video item.

In this embodiment, the media device 10 obtains content listing(s) from the one or more on-demand content sources 14 (step 1002). Each content listing identifies the on-demand video items accessible from the corresponding on-demand content source 14 and, preferably, metadata that describes the on-demand video items accessible from the corresponding on-demand content source 14. The metadata for an on-demand video item may include, for example, a title of the video item, a genre of the video item, and the like. For an on-demand video series item, the metadata preferably includes information that identifies the corresponding video series and a position of the video series item in the video series (e.g., information that identifies an on-demand video series item as season 2, episode 1 of the television series The Office).

At some point, the media device 10 detects a triggering event for the recommendation process (step 1004). The triggering event may be, for example, receiving input from one or more of the users 18-1 through 18-N in the viewing area of the media device 10 that requests recommendations. However, the present disclosure is not limited thereto. Any desired triggering event may be used to trigger the recommendation process. Once the recommendation process is triggered, in this embodiment, the local recommendation engine 30 of the media device 10 generates recommendations for the users 18-1 through 18-N currently in the viewing area of the media device 10 (step 1006). The recommendations include one or more video series item recommendations. In this embodiment, the video series item recommendations generated by the local recommendation engine 30 are recommendations for one or more video series items stored in the recorded content repository 22 of the media device 10 and/or recommendations for one or more video series items available to the media device 10 from the one or more on-demand content sources 14. As discussed below in detail, the recommendations are generated based on the personal viewing histories of the users 18-1 through 18-N in the viewing area of the media device 10 and, in some embodiments, the personal viewing histories of other users that have historically viewed video items in the viewing area of the media device 10. In the preferred embodiment, the video series item recommendations are optimized for the users 18-1 through 18-N (i.e., the viewer group) in the viewing area of the media device 10 such that the users 18-1 through 18-N do not get too far behind other users that watch the same video series at the media device 10 and/or such that the users 18-1 through 18-N do not get too far ahead of other users that watch the same video series at the media device 10.

The local recommendation engine 30 of the media device 10 then presents the recommendations to the users 18-1 through 18-N via the display device 16 (step 1008). In response, in this embodiment, the media device 10 receives a selection of one of the recommendations from one of the users 18-1 through 18-N (step 1010). The selection may be received, for example, via a remote control or other user interface component of the media device 10. Upon receiving the selection, the playback and recording function 20 of the media device 10 plays the corresponding video item (step 1012). More specifically, if the selected recommendation is for a video series item stored in the recorded content repository 22, the playback and recording function 20 obtains the video series item from the recorded content repository 22, processes the video series item using any applicable video processing techniques, and outputs the resulting digital or analog signal(s) to the display device 16 such that the video series item is rendered on the display device 16. If the selected recommendation is for a video series item available on-demand, the playback and recording function 20 requests the video series item from the corresponding on-demand content source 14, receives the video series item from the corresponding on-demand content source 14 via a corresponding video stream, processes the video stream using any applicable video processing techniques, and outputs the resulting digital or analog signal(s) to the display device 16 such that the video series item is rendered on the display device 16.

Figure 3:
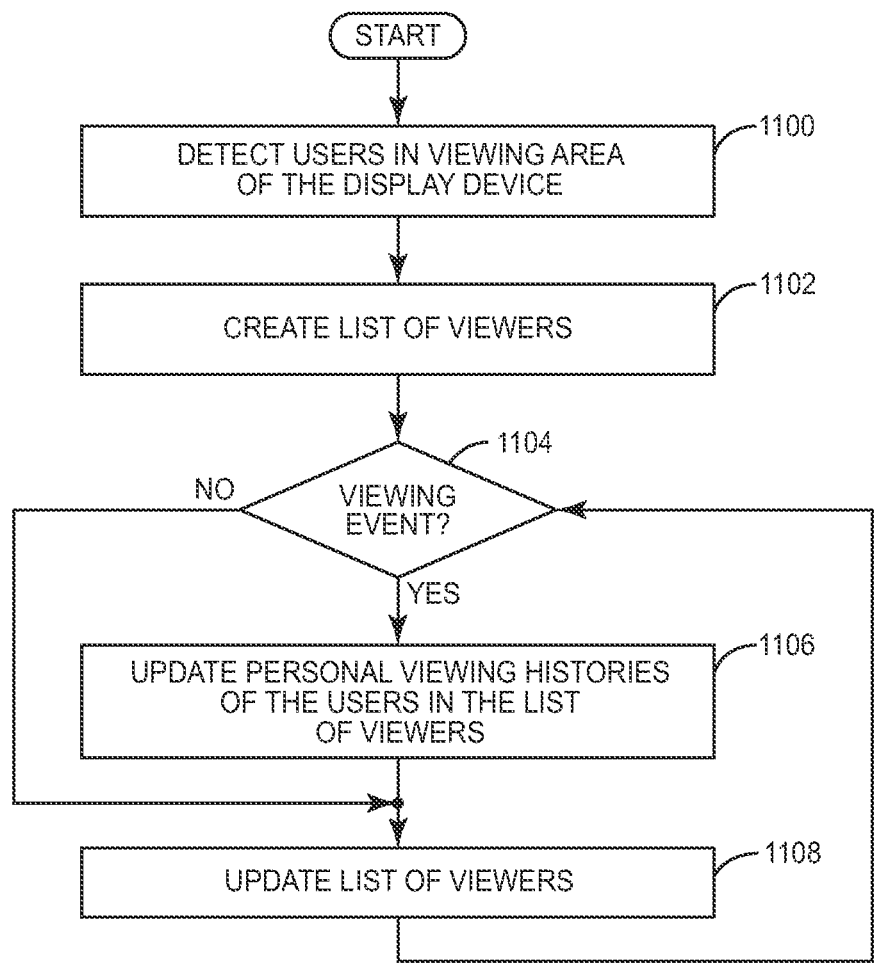
FIG. 3 illustrates a process for tracking personal viewing histories of users detected in a viewing area of the media device of FIG. 1 according to one embodiment of the present disclosure.

FIG. 3 is a flow chart that illustrates the operation of the media device 10 to track the personal viewing histories of users that view video content in the viewing area of the media device 10 according to one embodiment of the present disclosure. First, the user detection function 24 detects the users 18-1 through 18-N that are currently in the viewing area of the media device 10 (step 1100) and creates a corresponding list of users in the viewing area of the media device 10 (step 1102). The history tracking function 26 then determines whether a viewing event has occurred (step 1104). In one embodiment, the viewing event is starting playback of a video item at the media device 10. In another embodiment, the viewing event is completing playback of a video item at the media device 10. In yet another embodiment, the viewing event is either starting playback of a video item at the media device 10 or completing playback of a video item at the media device 10.

If a viewing event has not occurred, the process proceeds to step 1108. If a viewing event has occurred, the history tracking function 26 updates the personal viewing histories of the users 18-1 through 18-N in the list of users detected in the viewing area of the media device 10 to reflect the viewing event (step 1106). More specifically, if the viewing event is starting playback of a video item, the personal history of each user in the list of users detected in the viewing area of the media device 10 is updated to include information that identifies the media item and, optionally, information that indicates that the user has started playback of the video item and/or a time stamp that defines the date and time at which the user started playback of the video item. If the viewing event is completing playback of a video item, the personal history of each user in the list of users detected in the viewing area of the media device 10 is updated to include information that identifies the media item and, optionally, information that indicates that the user has completed playback of the video item and/or a time stamp that defines the date and time at which the user completed playback of the video item. Before proceeding, it should be noted that while in this example, the users 18-1 through 18-N in the viewing area of the media device 10 are detected prior to determining whether a viewing event has occurred, in another embodiment, the users 18-1 through 18-N in the viewing area of the media device 10 may be detected after determining that a viewing event has occurred.

Next, whether proceeding from step 1104 or step 1106, the history tracking function 26 interacts with the user detection function 24 to update the list of users currently in the viewing area of the media device 10 (step 1108). In this manner, when a user leaves the viewing area of the media device 10, that user is removed from the list of users, and the personal viewing profile of that user is no longer updated based on future viewing events until the user re-enters the viewing area of the media device 10. Similarly, when the user enters the viewing area of the media device 10, that user is added to the list such that the personal viewing history of that user is updated based on future viewing events as long as that user remains in the viewing area of the media device 10. The process then returns to step 1104 and is repeated.

Figure 4:
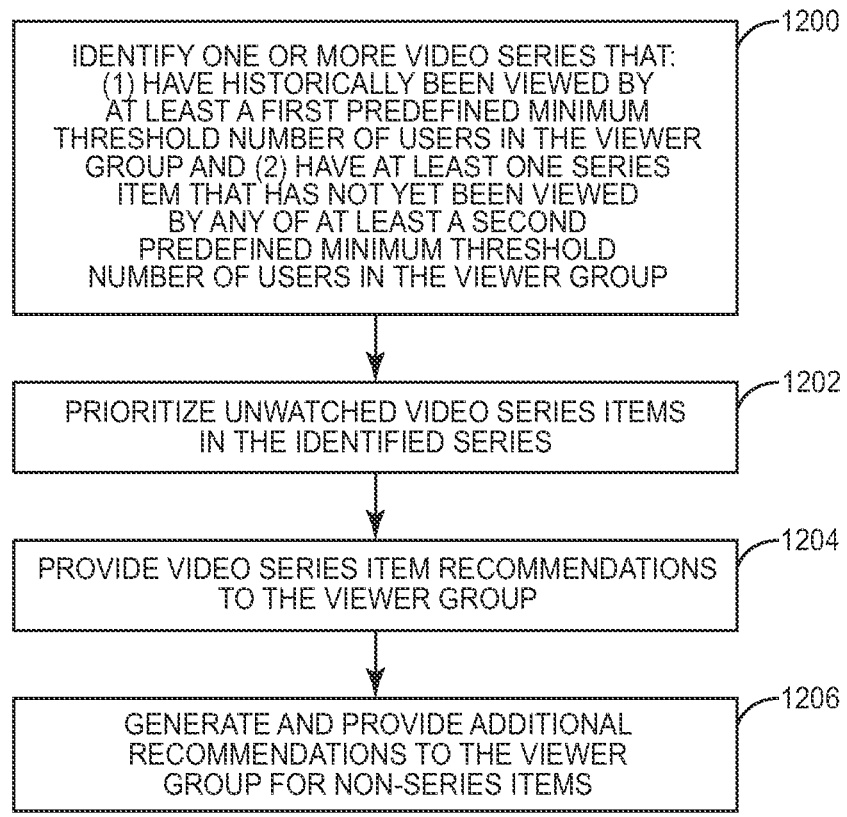
FIG. 4 illustrates a process for generating recommendations, including one or more video series item recommendations, for a viewer currently located in the viewing area of the media device according to one embodiment of the present disclosure.

FIG. 4 is a flow chart that illustrates the operation of the local recommendation engine 30 of the media device 10 to generate recommendations according to one embodiment of the present disclosure. First, the local recommendation engine 30 identifies one or more video series that: (1) have historically been viewed by at least a first predefined minimum threshold number of users in the viewer group and (2) have at least one series item available to the media device 10 either from local storage such as the recorded content repository 22 or the one or more on-demand content sources 14 that has not yet been viewed by any of at least a second predefined minimum threshold number of users in the viewer group (step 1200). The viewer group includes the users 18-1 through 18-N detected to be currently within the viewing area of the media device 10. The first and second predefined minimum threshold numbers of users may be defined as absolute numbers of users (e.g., 3 users) or as percentages (e.g., 50%). Further, the first and second predefined minimum threshold numbers of users may be the same minimum threshold number of users or different threshold numbers of users depending on the particular implementation. As an example, the first predefined minimum threshold number of users may be 100% of the users in the viewer group, and the second predefined minimum threshold number of users may also be 100% of the users in the viewer group. As a result, the one or more video series identified in step 1200 are one or more video series that: (1) have historically been viewed by all of the users 18-1 through 18-N in the viewer group and (2) have at least one video series item that is either stored by the media device 10 in the recorded content repository 22 or available to the media device 10 via the one or more on-demand content sources 14 and has not yet been viewed by any of the users 18-1 through 18-N in the viewer group.

In some embodiments, the recommendation process may end here such that the video series items of the one or more video series identified in step 1200 that have not yet been viewed by any of at least the second predefined minimum threshold number of users in the viewer group (also referred to herein as the "unwatched video series items" of the one or more identified video series) are recommended to the users 18-1 through 18-N in the viewer group. However, in this embodiment, the local recommendation engine 30 prioritizes the unwatched video series items of the one or more video series identified in step 1200 (step 1202). Each of the unwatched video series items may be assigned relative priorities (e.g., assign "best" video series item a priority of 1, "next best" video series item as priority of 2, etc.). Alternatively, each of the unwatched video series items may be assigned a computed priority value (e.g., a score ranging from 0 to 100). Each of the unwatched video series items is prioritized based on one or more criteria including one or more of the following:

- a number of the users 18-1 through 18-N in the viewer group that have historically viewed the corresponding video series but have not already viewed the video series item,
- a number of other users not in the viewer group that have historically viewed the corresponding video series in the viewing area of the media device 10 but have not already viewed the video series item,
- a number of other video series items following the video series item in the corresponding video series that have already been viewed by one or more other users not in the viewer group that have historically viewed the corresponding video series in the viewing area of the media device 10,
- a number of other video series items following the video series item in the corresponding video series that have already been viewed by all other users not in the viewer group that have historically viewed the corresponding video series in the viewing area of the media device 10,
- a number of other video series items preceding the video series item in the corresponding video series that have not already been viewed by one or more other users not in the viewer group that have historically viewed the corresponding video series in the viewing area of the media device 10, and
- a number of other video series items preceding the video series item in the corresponding video series that have not already been viewed by any other user not in the viewer group that have historically viewed the corresponding video series in the viewing area of the media device 10.

For example, in one embodiment, each of the unwatched video series items may be assigned a priority score in the range of 0 to 100 computed as:

$$\text{score} = \frac{\left(\begin{array}{c}\dfrac{NumViewers_{NW}}{TotalViewers} + \dfrac{NumOthers_{NW}}{TotalOthers} + \\ \dfrac{NumFollowing_{AllOthers}}{TotalFollowing} + \dfrac{NumPreceding_{AllOthers}}{TotalPreceding}\end{array}\right)}{4} \times 100$$

where $NumViewers_{NW}$ is the number of the users 18-1 through 18-N in the viewer group that have not already watched, or viewed, the video series item, TotalViewers is the total number of users in the viewer group, $NumOthers_{NW}$ is the number of other users not in the viewer group that have historically viewed the corresponding video series in the viewing area of the media device 10 but have not already viewed the video series item, TotalOthers is the total number of other users not in the viewer group that have historically viewed the corresponding video series in the viewing area of the media device 10, $NumFollowing_{AllOthers}$ is the number of video series items in the corresponding video series that follow the video series item in the video series and are available to the media device 10 and that have not already been viewed by all other users not in the viewing group that have historically viewed the corresponding video series in the viewing area of the media device 10, TotalFollowing is the total number of video series items in the corresponding video series that follow the video series item in the video series and are available to the media device 10, $NumPreceding_{AllOthers}$ is the number of video series items in the corresponding video series that precede the video series item in the video series and are available to the media device 10 and that have already been viewed by all other users that have historically viewed the corresponding video series in the viewing area of the media device 10, and TotalPreceding is the total number of video series items in the corresponding video series that precede the video series item in the video series and are available to the media device 10. Using this equation, for example, an unwatched video series item that has been watched by 2 out of 3 users in the viewer group, has not been watched by 1 out of 2 other users not in the viewer group, has 2 following video series items in the video series that have already been viewed by all of the other users, and has 5 preceding video series items in the video series that have already been viewed by all of the other users would have a priority score of 79. The high score indicates a high priority because the users 18-1 through 18-N are falling behind the other users in watching the video series. It should be noted that while the exemplary equation above uses a straight average, a weighted average may alternatively be used such that the different criteria are weighted differently. For instance, the first criteria in the equation above may be deemed to be the most important and therefore assigned a high weight, whereas the second criteria may be deemed to be least important and therefore assigned a low weight.

Next, the local recommendation engine 30 provides video series item recommendations to the users 18-1 through 18-N in the viewer group (step 1204). The video series item recommendations identify the corresponding unwatched video series items. In addition, the video series item recommendations may include or otherwise reflect the priorities of the corresponding unwatched video series items. More specifically, in one embodiment, the local recommendation engine 30 provides video series item recommendations to the users 18-1 through 18-N in the viewer group for all of the unwatched video series items where the video series item recommendations include the priorities of the unwatched video series items or otherwise reflect the priorities of the unwatched video series items. For example, the video series item recommendations may be provided by presenting a listing of recommended video series items on the display device 16, where the order of the video series item recommendations in the listing reflects the priorities of the corresponding unwatched video series items. In another embodiment, the local recommendation engine 30 provides video series item recommendations to the users 18-1 through 18-N in the viewer group only for those unwatched video series items having priorities that are greater than a predefined priority threshold. For example, if the unwatched video series items are assigned priority scores in the range of 0 to 100, the local recommendation engine 30 may provide video series item recommendations only for those unwatched video series items that are scored greater than a predefined minimum threshold score such as, for example, 50.

In this embodiment, the local recommendation engine 30 may also generate and provide additional recommendations to the users 18-1 through 18-N in the viewer group for non-series video items (step 1206). More specifically, the local recommendation engine 30 may utilize the personal viewing histories of the users 18-1 through 18-N in the viewer group as well as listings of content stored in the recorded content repository 22 and/or available from the one or more on-demand content sources 14 to generate additional recommendations for the users 18-1 through 18-N. For example, the local recommendation engine 30 may process the personal viewing histories of the users 18-1 through 18-N to determine aggregate preferences of the viewer group and then select one or more non-series video items to recommend based on comparisons of the aggregate preferences of the viewer group and metadata describing non-series video items available to the media device 10 from the recorded content repository 22 and/or the one or more on-demand content sources 14.

Before proceeding, it should be noted that as part of the recommendation process, the local recommendation engine 30 may also identify additional users that can be invited to join the viewing group in order to increase the priority of one or more of the unwatched video series item recommendations. For example, for a video series item recommendation for an unwatched video series item that has not been watched by two other users that historically have viewed the corresponding video series in the viewing area of the media device 10, the local recommendation engine 30 may determine that the priority of the unwatched video series item and thus the video series item recommendation may be increased if the two other users join the viewing group. The local recommendation engine 30 may then invite the two other users to join the viewer group using any suitable messaging scheme such as, for example, sending a text message to mobile devices of the other two users using stored mobile telephone numbers of those users, sending email messages to the other two users using stored email addresses of the two users, sending instant messages to the users using stored usernames of the two users, sending messages to the mobile devices of the two others users if located within a connected LAN, or the like. The two other users may be invited automatically or after obtaining approval from one or more of the users 18-1 through 18-N in the viewer group. In addition or alternatively, the local recommendation engine 30 may notify the users 18-1 through 18-N of the two other users that the local recommendation engine 30 recommends inviting to the viewer group.

Figure 5:
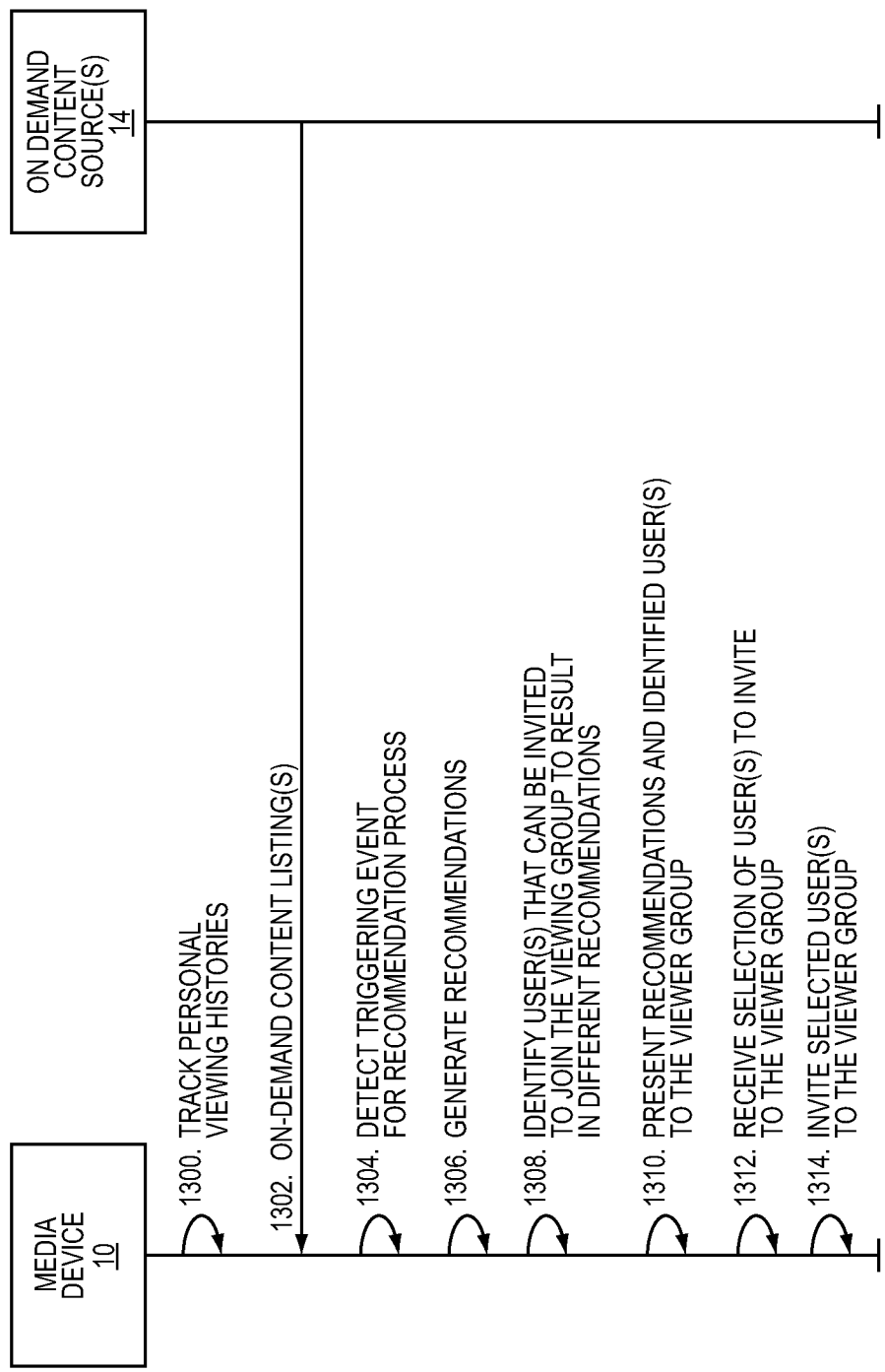
FIG. 5 illustrates the operation of the system of FIG. 1 according to another embodiment of the present disclosure.

FIG. 5 illustrates the operation of the system of FIG. 1 according to another embodiment of the present disclosure. First, the history tracking function 26 of the media device 10 tracks the personal viewing histories of users, including the users 18-1 through 18-N, that view video content played by the media device 10 and displayed via the display device 16 (step 1300). As described above with respect to step 1000 of FIG. 2 and the process of FIG. 3, the history tracking function 26 detects when a video item, such as but not limited to a video series item, is played by the media device 10 and displayed via the display device 16. In response, the history tracking function 26 updates the personal viewing histories of the users 18-1 through 18-N detected within the viewing area of the media device 10 to reflect that the users 18-1 through 18-N have viewed the video item.

In this embodiment, in addition to tracking the personal viewing histories of the users that view video items played by the media device 10 and displayed by the display device 16, the media device 10 obtains on-demand content listing(s) from the one or more on-demand content sources 14 (step 1302). Each content listing identifies the on-demand video items accessible from the corresponding on-demand content source 14 and, preferably, metadata that describes the on-demand video items accessible from the corresponding on-demand content source 14. The metadata for an on-demand video item may include, for example, a title of the video item, a genre of the video item, and the like. For an on-demand video series item, the metadata preferably includes information that identifies the corresponding video series and a position of the video series item in the video series (e.g., information that identifies an on-demand video series item as season 2, episode 1 of the television series The Office).

At some point, the media device 10 detects a triggering event for the recommendation process (step 1304). The triggering event may be, for example, receiving input from one or more of the users 18-1 through 18-N in the viewing area of the media device 10 that requests recommendations. However, the present disclosure is not limited thereto. Any desired triggering event may be used to trigger the recommendation process. Once the recommendation process is triggered, in this embodiment, the local recommendation engine 30 of the media device 10 generates recommendations for the users 18-1 through 18-N currently in the viewing area of the media device 10 (step 1306). As discussed above with respect to step 1006 of FIG. 2 and the process of FIG. 4, the recommendations include one or more video series item recommendations, where the video series item recommendations are recommendations for one or more video series items stored in the recorded content repository 22 of the media device 10 and/or recommendations for one or more video series items available to the media device 10 from the one or more on-demand content sources 14. Further, as described with respect to FIG. 4, the local recommendation engine 30 may assign priorities to the video series item recommendations.

In this embodiment, the local recommendation engine 30 identifies other user(s) that have historically viewed video items in the viewing area of the media device 10 that can be invited to join the viewer group to result in different video series item recommendations (step 1308). More specifically, in one embodiment, the local recommendation engine 30 identifies all other users that have historically watched video items in the viewing area of the media device 10. Then, the local recommendation engine 30 forms potential viewer groups by adding each individual user of the identified other users and each combination of two or more users from the identified other users to the viewer group. For instance, if there are three other users A, B, and C, then the potential viewer groups may be: (1) the current viewer group+user A, (2) the current viewer group+user B, (3) the current viewer group+user C, (4) the current viewer group+users A and B, (5) the current viewer group+users A and C, (6) the current viewer group+users B and C, and (7) the current viewer group+users A, B, and C. Then, for each potential viewer group, the local recommendation engine 30 performs steps 1200 and 1202 of FIG. 4 to generate potential video series item recommendations and corresponding priorities. The local recommendation engine 30 then identifies the potential video series item recommendations that are not included in the video series items already generated for the viewer group and that have priorities greater than a predefined threshold priority (e.g., threshold of 75 where priorities are scores ranging from 0 to 100). The other user(s) in the corresponding potential viewer groups for the identified potential video series item recommendations are identified as the user(s) that can be invited to the viewer group. As one exemplary alternative, the local recommendation engine 30 may identify the potential viewer group that results in the highest number of different video series item recommendations that are not already included in the video series item recommendations generated for the viewer group. Then, the other user(s) in the identified potential viewer group are identified as the user(s) that can be invited to the viewer group. It should be noted that the exemplary embodiments described above for identifying the other user(s) that can be invited to the viewer group are exemplary and should not be construed as limiting the present disclosure. Any suitable technique for identifying other user (s) that would result in different video series item recommendations may be used.

The local recommendation engine 30 of the media device 10 then presents the recommendations and the user(s) that can be invited to join the viewer group to result in different recommendations to the users 18-1 through 18-N via the display device 16 (step 1310). In response, in this embodiment, the media device 10 receives a selection of one or more of the users to be invited to join the viewer group from one of the users 18-1 through 18-N (step 1312). The selection may be received, for example, via a remote control or other user interface component of the media device 10. Upon receiving the selection, the local recommendation engine 30 invites the selected user(s) to join the viewer group (step 1314). The invitation may be sent to the selected user(s) using any suitable messaging scheme such as, for example, sending a text message to mobile devices of the selected user(s) using stored mobile telephone numbers of the selected user(s), sending email messages to the selected user(s) using stored email addresses of the selected user(s), sending instant messages to the selected user(s) using stored usernames of the selected user(s), sending messages to the mobile devices of the selected user(s) if located within a connected LAN, or the like. Note that steps 1312 and 1314 are optional. In an alternative embodiment, the users 18-1 through 18-N may invite the other users to join the viewer group on their own (e.g., find the other users and verbally invite them to join the viewer group, call the other users, text message the other users, email the other users, Instant Message (IM) the other users, or the like).

Figure 6:
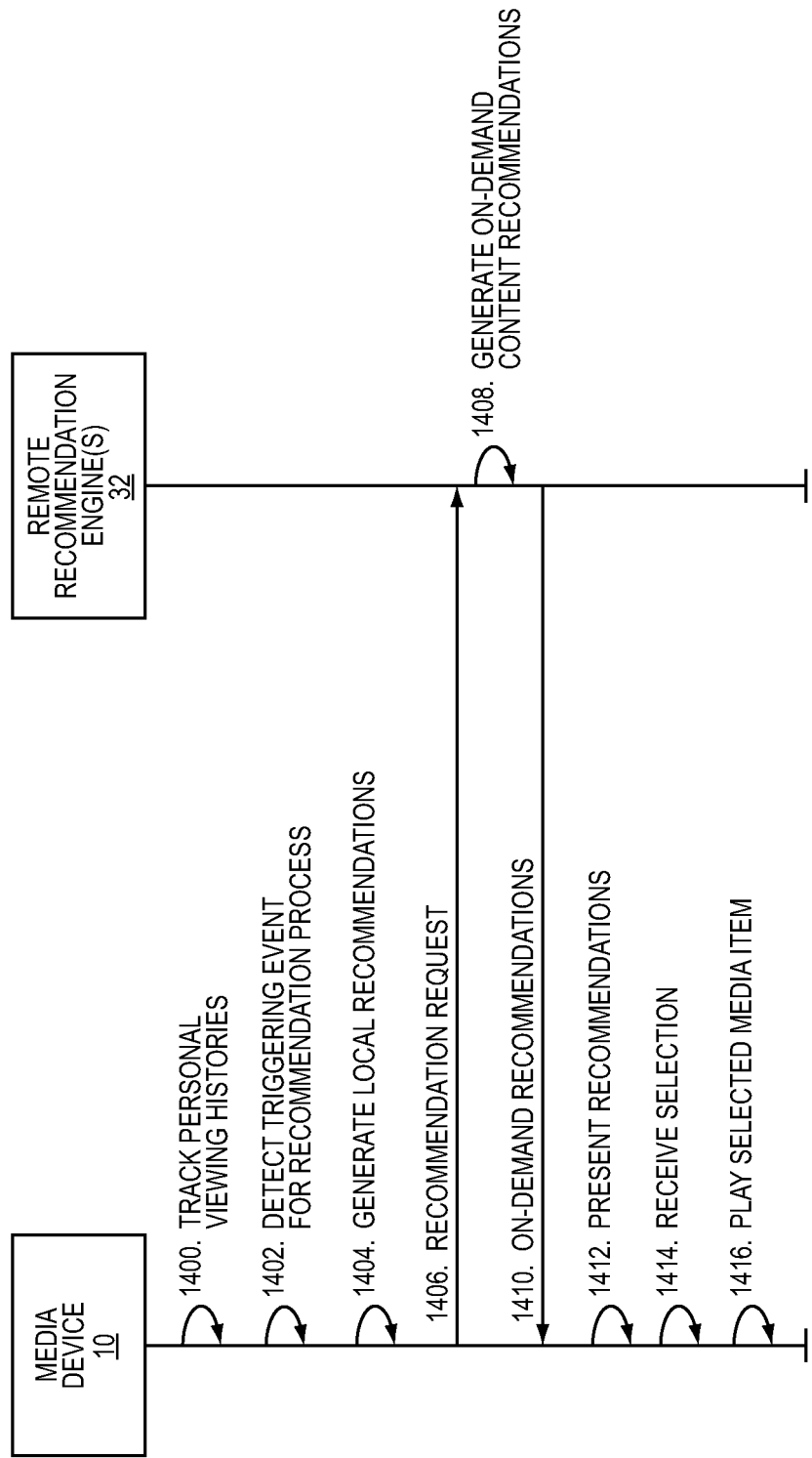
FIG. 6 illustrates the operation of the system of FIG. 1 wherein the recommendations generated for the viewer group detected in the viewing area of the media device include recommendations generated by one or more remote recommendation engines according to yet another embodiment of the present disclosure.

FIG. 6 illustrates the operation of the system of FIG. 1 according to yet another embodiment of the present disclosure. This embodiment is similar to that of FIG. 2, but where recommendations for on-demand content are generated by the one or more corresponding remote recommendation engines 32. First, the history tracking function 26 of the media device 10 tracks the personal viewing histories of users, including the users 18-1 through 18-N, that view video content played by the media device 10 and displayed via the display device 16 (step 1400). As described above with respect to step 1000 of FIG. 2 and the process of FIG. 3, the history tracking function 26 detects when a video item, such as but not limited to a video series item, is played by the media device 10 and displayed via the display device 16. In response, the history tracking function 26 updates the personal viewing histories of the users 18-1 through 18-N detected within the viewing area of the media device 10 to reflect that the users 18-1 through 18-N have viewed the video item.

At some point, the media device 10 detects a triggering event for the recommendation process (step 1402). The triggering event may be, for example, receiving input from one or more of the users 18-1 through 18-N in the viewing area of the media device 10 that requests recommendations. However, the present disclosure is not limited thereto. Any desired triggering event may be used to trigger the recommendation process. Once the recommendation process is triggered, in this embodiment, the local recommendation engine 30 of the media device 10 generates recommendations for the users 18-1 through 18-N currently in the viewing area of the media device 10 for video items stored in the recorded content repository 22 of the media device 10 (step 1404). The recommendations include one or more video series item recommendations. In this embodiment, the video series item recommendations generated by the local recommendation engine 30 are recommendations for one or more video series items stored in the recorded content repository 22 of the media device 10. Otherwise, the recommendations are generated as described above with respect to step 1006 of FIG. 2 and the process of FIG. 4.

In addition, the local recommendation engine 30 generates further recommendations by sending a recommendation request to the one or more remote recommendation engines 32 (step 1406). In one embodiment, the recommendation request includes the personal viewing histories of the users 18-1 through 18-N in the viewer group and, in some embodiments, the personal viewing histories of the other users that have historically viewed video items in the viewing area of the media device 10. In another embodiment, the recommendation request includes only relevant portions of the personal viewing histories of the users 18-1 through 18-N in the viewer group and, in some embodiments, the personal viewing histories of the other users that have historically viewed video items in the viewing area of the media device 10. In one embodiment, the relevant portion of a personal viewing history of a user for a particular one of the one or more remote recommendation engines 32 is a portion of the personal viewing history of the user regarding viewing of on-demand video items streamed to the media device 10 from the one or more corresponding on-demand content sources 14. Note that the relevant portions of the personal viewing histories of the users may alternatively be maintained by the corresponding one or more on-demand content sources 14. In another embodiment, the request includes seed data for the recommendation process derived from the personal viewing histories of the users 18-1 through 18-N in the viewer group and, in some embodiments, the personal viewing histories of the other users that have historically viewed video items in the viewing area of the media device 10. The seed data may include, for example, information that identifies one or more video series historically viewed by the users 18-1 through 18-N in the viewer group, information that identifies video series items in the one or more video series that have already been viewed by the users 18-1 through 18-N in the viewer group, and information that identifies video series items in the one or more video series that have already been viewed by other users that have historically viewed the one or more video series items in the viewing area of the media device 10.

In response to the recommendation request, the one or more remote recommendation engines 32 generate recommendations for the viewer group (step 1408). The recommendations include video series item recommendations for video series items available to the media device 10 from the one or more corresponding on-demand content sources 14. Otherwise, the one or more remote recommendation engines 32 generate the recommendations in the same manner as described above with respect to step 1006 of FIG. 2 and the process of FIG. 4. Once the recommendations are generated, the one or more remote recommendation engines 32 return the recommendations to the media device 10 (step 1410).

The local recommendation engine 30 of the media device 10 then presents the recommendations to the users 18-1 through 18-N via the display device 16 (step 1412). In response, in this embodiment, the media device 10 receives a selection of one of the recommendations from one of the users 18-1 through 18-N (step 1414). The selection may be received, for example, via a remote control or other user interface component of the media device 10. Upon receiving the selection, the playback and recording function 20 of the media device 10 plays the corresponding video item (step 1416). More specifically, if the selected recommendation is for a video series item stored in the recorded content repository 22, the playback and recording function 20 obtains the video series item from the recorded content repository 22, processes the video series item using any applicable video processing techniques, and outputs the resulting digital or analog signal(s) to the display device 16 such that the video series item is rendered on the display device 16. If the selected recommendation is for a video series item available on-demand, the playback and recording function 20 requests the video series item from the corresponding on-demand content source 14, receives the video series item from the corresponding on-demand content source 14 via a corresponding video stream, processes the video stream using any applicable video processing techniques, and outputs the resulting digital or analog signal(s) to the display device 16 such that the video series item is rendered on the display device 16. Before proceeding, it should be noted that while not illustrated in the embodiment of FIG. 6, the local recommendation engine 30 and/or the one or more remote recommendation engines 32 may identify other users that can be invited to join the viewer group in order to either increase the priority of one or more of the video series item recommendations and/or to result in different video series item recommendations as described above with respect to FIGS. 4 and 5.

Figure 7:
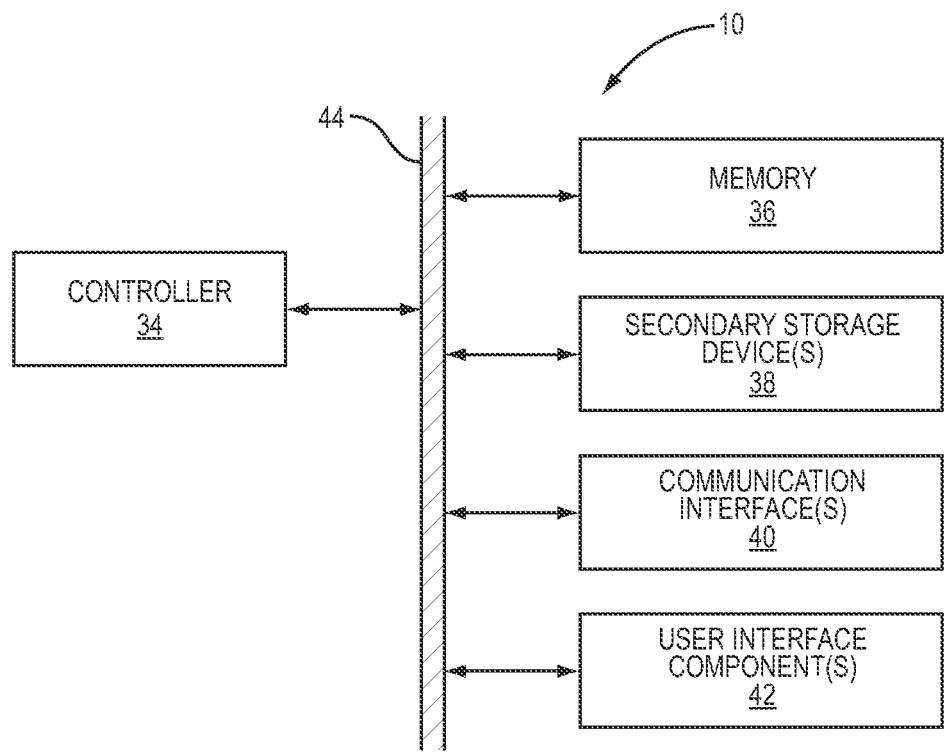
FIG. 7 is a block diagram of the media device of FIG. 1 according to one embodiment of the present disclosure.

FIG. 7 is a block diagram of the media device 10 of FIG. 1 according to one embodiment of the present disclosure. As illustrated, the media device 10 includes a controller 34 connected to memory 36, one or more secondary storage devices 38, one or more communication interfaces 40, and one or more user interface components 42 by a bus 44 or similar mechanism. The controller 34 is one or more microprocessors, one or more digital Application Specific Integrated Circuits (ASICs), one or more Field Programmable Gate Arrays (FPGAs), or similar hardware controller, or any combination thereof. The playback and recording function 20, the user detection function 24, the history tracking function 26, and the local recommendation engine 30 are each implemented as hardware components within the controller 34, software components stored in the memory 36 and executed by the controller 34, or a combination thereof. The one or more secondary storage devices 38 are digital storage devices such as, for example, one or more hard disk drives, one or more FLASH memory components, or the like. The recorded content repository 22 of the media device 10 is implemented in the one or more secondary storage devices 38. The one or more communication interfaces 40 include one or more wired and/or wireless communication interfaces by which the media device 10 receives content from the one or more broadcast content sources 12 and one or more wired and/or wireless communication interfaces by which the media device 10 requests and receives on-demand content from the one or more on-demand content sources 14. For example, the one or more communication interfaces 40 may include a cable network interface (e.g., a cable card), an Ethernet interface, a local wireless interface (e.g., an IEEE 802.11x interface), or the like. The one or more user interface components 42 may include, for example, an Infra-red (IR) receiver for receiving user input via an associated remote control, one or more user input components (e.g., buttons or a keypad), a display, a speaker, or the like, or any combination thereof.

Figure 8:
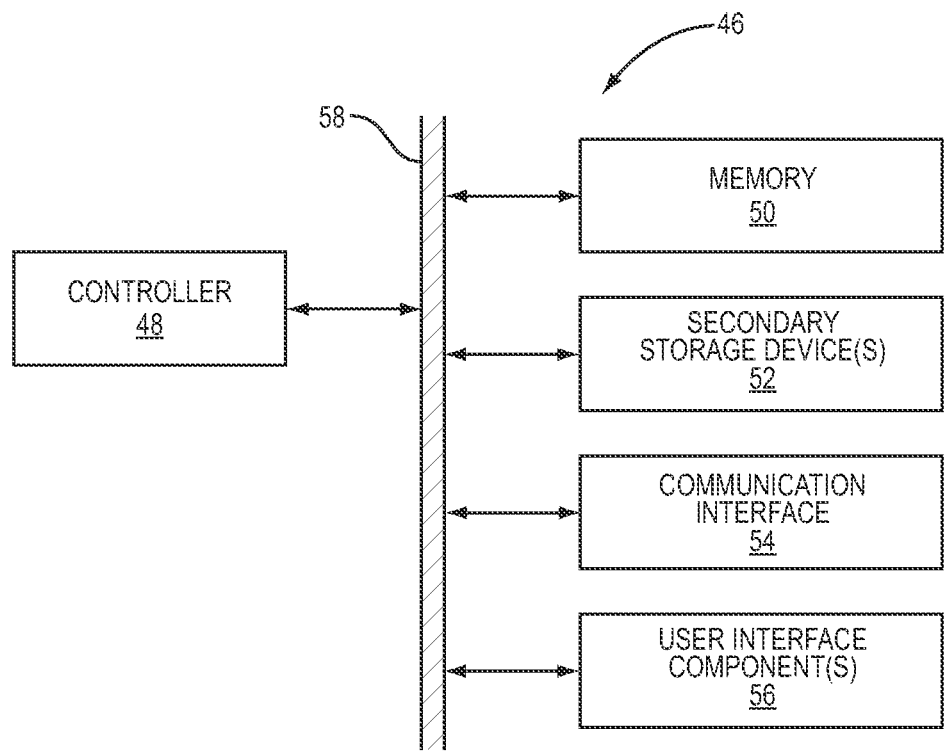
FIG. 8 is a block diagram of a computing device hosting one of the remote recommendation engines of FIG. 1 according to one embodiment of the present disclosure.

FIG. 8 is a block diagram of a computer server 46 hosting one of the remote recommendation engines 32 of FIG. 1 according to one embodiment of the present disclosure. As illustrated, the computer server 46 includes a controller 48 connected to memory 50, one or more secondary storage devices 52, a communication interface 54, and one or more user interface components 56 by a bus 58 or similar mechanism. The controller 48 is a microprocessor, digital ASIC, FPGA, or similar hardware controller. In this embodiment, the controller 48 is a microprocessor, and the remote recommendation engine 32 is implemented in software and stored in the memory 50 for execution by the controller 48. The one or more secondary storage devices 52 are digital storage devices such as, for example, one or more hard disk drives. The communication interface 54 is a wired or wireless communication interface that communicatively couples the computer server 46 to the media device 10 via a network (e.g., a terrestrial or satellite cable network or the Internet). The one or more user interface components 56 include, for example, a touchscreen, a display, one or more user input components (e.g., a keypad), a speaker, or the like, or any combination thereof.

Figure 9:
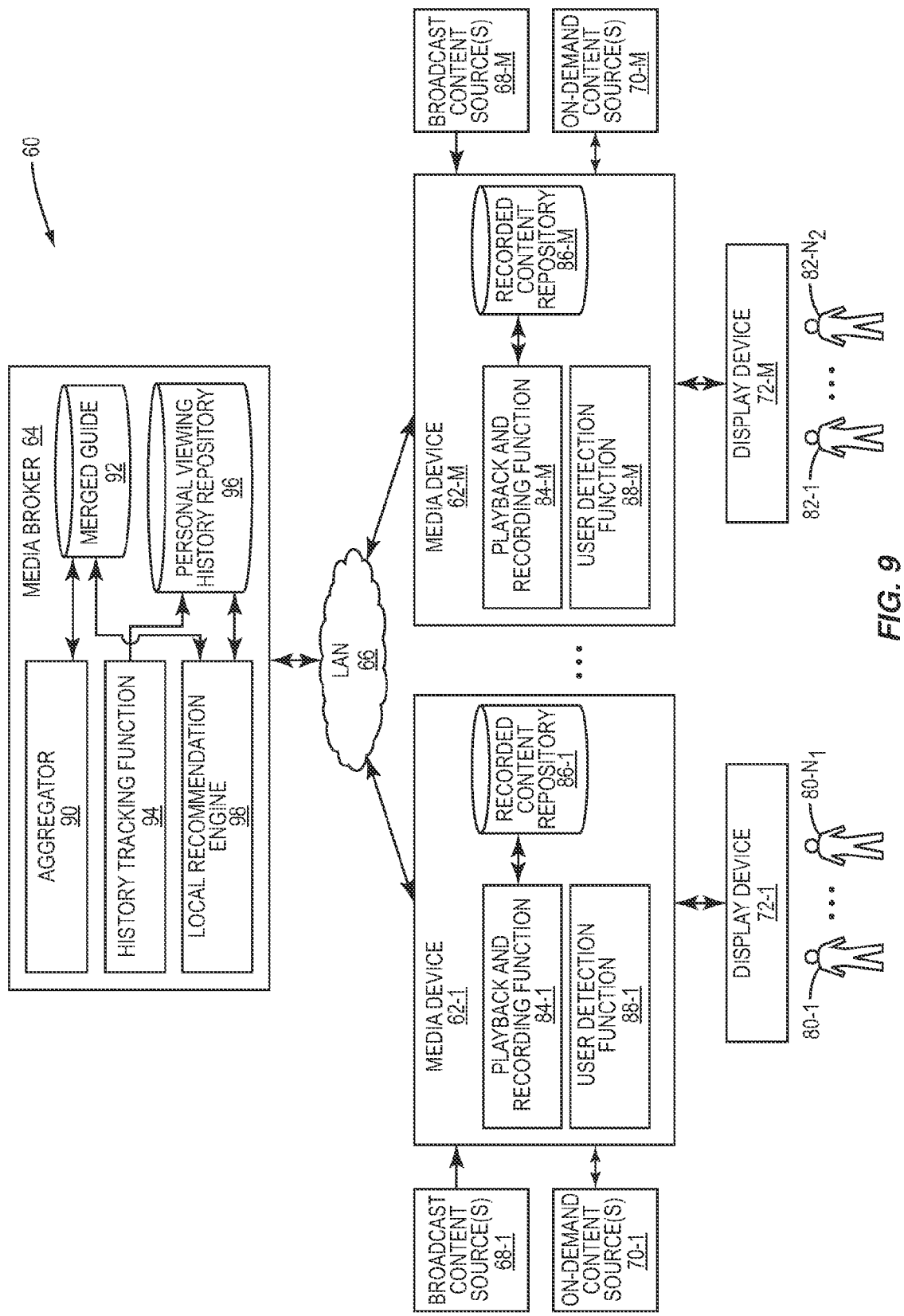
FIG. 9 illustrates a system in which video series item recommendations are generated for a viewer group detected in a viewing area of a media device according to another embodiment of the present disclosure.

FIG. 9 illustrates a system 60 in which recommendations are provided to viewer groups according to another embodiment of the present disclosure. The system 60 is at a user premises such as, for example, a home or residence of a person or family. As illustrated, the system 60 includes a number of media devices 62-1 through 62-M (generally referred to individually as media device 62 and collectively as media devices 62) and a media broker 64 connected via a LAN 66. The LAN 66 may be a wired LAN, a wireless LAN (e.g., IEEE 802.11x LAN), or a combination thereof. Each of the media devices 62 is generally any device that provides playback of stored video series items and/or streaming video items. More specifically, in one embodiment, the media devices 62 may be set-top boxes, personal computers, Apple TV® devices, Universal Plug and Play (UPNP) and/or Digital Living Network Alliance (DLNA) enabled televisions, televisions equipped with Google® TV, or the like. Further, the media devices 62 may be all of the same type of media device (e.g., all set-top boxes) or may be various types of media devices (e.g., some are set-top boxes, some are personal computers, and some are UPNP or DLNA enabled televisions).

The media devices 62-1 through 62-M are enabled to access video content from one or more broadcast content sources 68-1 through 68-M (generally referred to herein individually as broadcast content source 68 or collectively as broadcast content sources 68) and one or more on-demand content sources 70-1 through 70-M (generally referred to herein individually as on-demand content source 70 or collectively as on-demand content sources 70). Note that while numbered and illustrated separately, it should be understood that the media devices 62 may have access to the same broadcast content source(s) 68 or different broadcast content source(s) 68 and may have access to the same on-demand content source(s) 70 or different on-demand content source(s) 70. The one or more broadcast content sources 68 include, for example, one or more cable or satellite television service providers, one or more Internet sources that multicast or web-cast video content, or the like. The one or more on-demand content sources 70 include, for example, one or more cable or satellite television service providers that provide video on-demand, one or more Internet websites or sources that stream video content on-demand, or the like. In addition, the media devices 62 are enabled to access video content from one another via the LAN 66. For example, the media device 62-1 may stream video content to the media device 62-M via the LAN 66.

The media devices 62-1 through 62-M are enabled to output video content to connected display devices 72-1 through 72-M (generally referred to herein individually as display device 72 and collectively as display devices 72). For instance, the media device 62-1 is enabled to output video content to the display device 72-1, where the video content is presented to users 80-1 through 80-$N_1$ (generally referred to herein individually as user 80 and collectively as users 80) that are within the viewing area of the media device 62-1. Likewise, the media device 62-M is enabled to output video content to the display device 72-M, where the video content is presented to users 82-1 through 82-$N_2$ (generally referred to herein individually as user 82 and collectively as users 82) that are within the viewing area of the media device 62-M. Each of the display devices 72 may be, for example, a television, a monitor, a projector, or the like that is connected directly to the corresponding media device 62 via a wired connection (e.g., a High Definition Multimedia Interface (HDMI) connection) or connected indirectly to the corresponding media device 62 via an intermediate device (e.g., an A/V receiver) and corresponding wired connections from the media device 62 to the intermediate device and from the intermediate device to the display device 72. Note that while the display devices 72 are separate from the media devices 62 in this embodiment, in an alternative embodiment, one or more of the display devices 72 may be part of the corresponding media devices 62 (e.g., an embodiment where one of the media devices 62 is an all-in-one computer such as, for example, an Apple® iMac®).

The media devices 62-1 through 62-M include, in this embodiment, corresponding playback and recording functions 84-1 through 84-M (generally referred to individually as playback and recording function 84 and collectively as playback and recording functions 84), recorded content repositories 86-1 through 86-M (generally referred to individually as recorded content repository 86 and collectively as recorded content repositories 86), and user detection functions 88-1 through 88-M (generally referred to individually as user detection function 88 and collectively as user detection functions 88). Notably, like with the media device 10, in some instances, the media devices 62 may not include the recorded content repositories 86 (e.g., if the media devices 62 do not have recording capabilities) and/or may include additional content storage (e.g., if the media devices 62 are enabled to store video content obtained in a manner other than recording such as purchasing the video content).

For each of the media devices 62, the playback and recording function 84 of the media device 62 may be implemented in hardware, software, or a combination of hardware and software. In general, the playback and recording function 84 operates to provide playback of video content from the one or more broadcast content sources 68, the one or more on-demand content sources 70, and/or one or more of the other media devices 62 and output the video content to the corresponding display device 72. In addition, in this embodiment, the playback and recording function 84 provides a DVR feature by which the playback and recording function 84 records video content received from the one or more broadcast content sources 68 and stores the recorded video content in the recorded content repository 86. The video content played by and/or recorded by the playback and recording function 84 is preferably user selectable. For example, one or more of the users in the viewing area of the media device 62 may interact with the media device 62 via a corresponding remote control device (not shown) to select video content to be played by the media device 62 and presented to the users via the corresponding display device 72 or to select video content to be recorded and stored in the recorded content repository 86 of the media device 62.

The user detection function 88 may be implemented in hardware, software, or a combination of hardware and software. In general, the user detection function 88 uses any suitable technology to detect the users located in a viewing area of the display device 72, which is also referred to herein as a viewing area of the media device 62. For example, the user detection function 88-1 detects the users 80 in the viewing area of the media device 62-1. Likewise, the user detection function 88-M detects the users 82 in the viewing area of the media device 62-M. Notably, as used herein, detecting the users in the viewing area of the media device 62 is not simply detecting that there are users in the viewing area of the media device 62, but rather detecting the identities of the users in the viewing area of the media device 62. In one exemplary embodiment, the user detection function 88 detects the users in the viewing area of the media device 62 via facial recognition. More specifically, the user detection function 88 may include a camera or be connected to an external camera that captures an image of any users in the viewing area of the media device 62. The user detection function 88 may then utilize known facial recognition techniques to detect the users in the viewing area of the media device 62.

In another exemplary embodiment, the user detection function 88 detects the users via a wireless PAN technology such as, for example, a power class 2 or 3 Bluetooth® transceiver (i.e., Bluetooth® transceiver with range of approximately 10 m or 1 m). More specifically, using wireless PAN technology, the user detection function 88 may detect mobile devices of the users in the viewing area of the media device 62. For instance, the user detection function 88 may detect the Bluetooth® IDs of Bluetooth®-enabled mobile devices of the users. The Bluetooth® IDs of the mobile devices of the users may be used as IDs of the users in the viewing area of the media device 62 when tracking personal viewing histories of the users. Alternatively, the Bluetooth® IDs of the mobile devices of the users may be correlated to other identifiers of the users (e.g., legal names or usernames) used for tracking the personal viewing histories of the users. In yet another exemplary embodiment, the user detection function 88 may enable one or more of the users to manually identify the users in the viewing area of the media device 62 via, for example, a remote control of the media device 62. Note that the exemplary embodiments of the user detection function 88 are exemplary and not intended to limit the scope of the present disclosure. Any suitable technology for detecting the users in the viewing area of the media device 62 may be used.

The media broker 64 may be implemented in software, hardware, or a combination thereof. For example, the media broker 64 may be implemented in software executed by a computer or similar computing device connected to the LAN 66. The media broker 64 includes an aggregator 90, a merged guide 92, a history tracking function 94, a personal viewing history repository 96, and a local recommendation engine 98. The aggregator 90 is implemented in hardware, software, or a combination of hardware and software. The aggregator 90 operates to obtain local guides from the media devices 62 connected to the LAN 66. The local guides of the media devices 62 provide listings of video content accessible to the media devices 62 from the corresponding recorded content repositories 86, the broadcast content sources 68, and the on-demand content sources 70. The aggregator 90 aggregates, or combines, the local guides of the media devices 62 to provide the merged guide 92 for the system 60. The merged guide 92 preferably includes a listing of video items accessible to the media devices 62 and, for each video item, information that identifies the media device(s) 62 having access to the video item. The media device(s) 62 identified as having access to a particular video item are the media device(s) 62 that have direct access to the video item from the recorded content repository 86 of the media device 62, the broadcast content source(s) 68 of the media device 62, or the on-demand content source(s) 70 of the media device 62.

The history tracking function 94 interacts with the playback and recording functions 84 and the user detection functions 88 of the media devices 62 to create and maintain personal viewing histories for users, such as but not limited to the users 80 and 82, that view video content in the viewing areas of the media devices 62. The personal viewing histories of the users are stored in the personal viewing history repository 96. More specifically, in one embodiment, the playback and recording function 84 of each of the media devices 62 detects viewing events. Upon detecting a viewing event, the playback and recording function 84 reports the viewing event and a list of the users currently in the viewing area of the media device 62, as detected by the user detection function 88, to the history tracking function 94. In response, the history tracking function 94 updates the personal viewing histories of the users in the list of users in the viewing area of the media device 62 to reflect the detected viewing event. The viewing event may be starting playback of a video item or completing playback of a video item, depending on the particular embodiment. For each user, the personal viewing history of the user includes information that identifies video items viewed by the user and, optionally, one or more timestamps that define a date and time at which the user started playback of the video item and/or a date and time at which the user completed playback of the video item.

The local recommendation engine 98 is also implemented in hardware, software, or a combination thereof. In general, the local recommendation engine 98 operates to generate video series item recommendations for the users in the viewing areas of the media devices 62. Using the users 80 in the viewing area of the media device 62-1 as an example, the local recommendation engine 98 operates to generate video series item recommendations for the users 80 in the viewing area of the media device 62-1. In this embodiment, the video series item recommendations are recommendations for one or more video series items stored in the recorded content repository 86-1 of the media device 62-1, recommendations for one or more on-demand video series items from the on-demand content source(s) 70-1, recommendations for one or more video series items stored in the recorded content repository 86 of one of the other media devices 62, and/or recommendations for one or more video series items available to one or more of the other media devices 62 from the one or more on-demand content sources 70 accessible to the one or more other media devices 62. In the preferred embodiment, the video series item recommendations are optimized for the viewer group (i.e., the users 80) in the viewing area of the media device 62-1 such that the users 80 do not get too far behind other users that typically watch the same video series at the same user premises (i.e., in the viewing areas of the media devices 62 in the system 60) and/or such that the users 80 do not get too far ahead of other users that typically watch the same video series at the same user premises.

Figure 10:
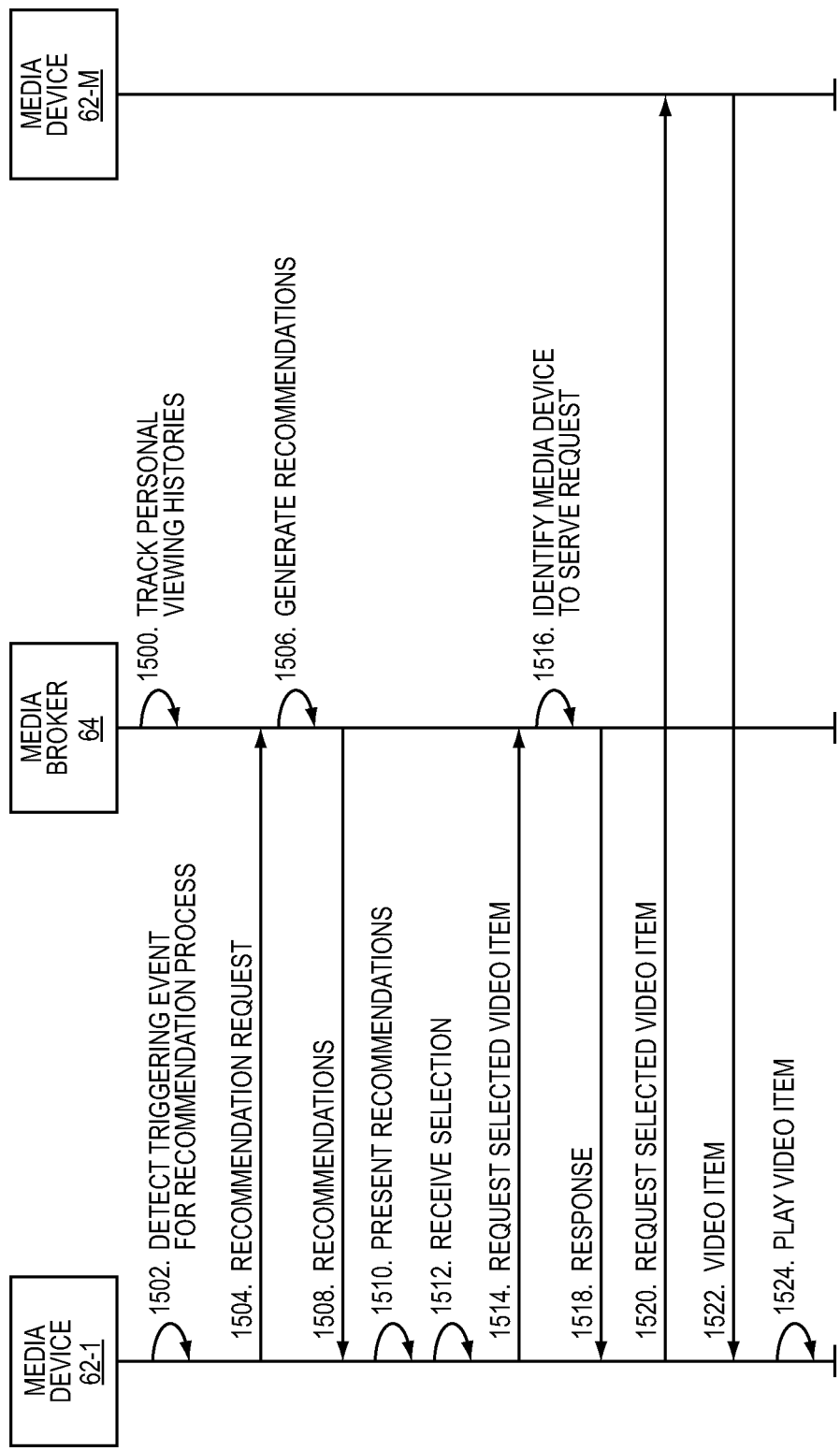
FIG. 10 illustrates the operation of the system of FIG. 9 according to one embodiment of the present disclosure.

FIG. 10 illustrates the operation of the system 60 of FIG. 9 according to one embodiment of the present disclosure. First, the media broker 64, and more specifically the history tracking function 94 of the media broker 64, tracks the personal viewing histories of users, including but not limited to the users 80 and 82, that view video content played by the media devices 62 and displayed via the corresponding display devices 72 (step 1500). In this embodiment, at some point, the media device 62-1 detects a triggering event for the recommendation process (step 1502). The triggering event may be, for example, receiving input from one or more of the users 80 in the viewing area of the media device 62-1 that requests recommendations. However, the present disclosure is not limited thereto. Any desired triggering event may be used to trigger the recommendation process.

Once the recommendation process is triggered, in this embodiment, the playback and recording function 84-1 of the media device 62-1 sends a recommendation request to the media broker 64 (step 1504). The recommendation request includes a list of the users 80 in the viewing area of the display device 72. In response to the recommendation request, the local recommendation engine 98 of the media broker 64 generates recommendations for the users 80 currently in the viewing area of the media device 62-1 for one or more video items stored by one of the media devices 62 in the system 60 or accessible to one or more of the media devices 62 from the on-demand content source(s) 70 (step 1506). The recommendations include one or more video series item recommendations. In this embodiment, the video series item recommendations generated by the local recommendation engine 98 are recommendations for one or more video series items stored in the recorded content repository 86-1 of the media device 62-1, recommendations for one or more video series items stored in the recorded content repository 86 of one or more of the other media devices 62, recommendations for one or more video series items accessible to the media device 62-1 from the on-demand content source(s) 70-1, and/or recommendations for one or more video series items accessible to one or more of the other media devices 62 from the corresponding on-demand content source(s) 70. The recommendations are generated based on the personal viewing histories of the users 80 in the viewing area of the media device 62-1 and, in some embodiments, the personal viewing histories of other users that have historically viewed video items in the viewing areas of the media device 62 in the system 60. In the preferred embodiment, the video series item recommendations are optimized for the users 80 in the viewing area of the media device 62-1 such that the users 80 do not get too far behind other users that typically watch the same video series at the user premises (i.e., in the viewing areas of the media devices 62) and/or such that the users 80 do not get too far ahead of other users that typically watch the same video series at the user premises.

More specifically, in one embodiment, in order to generate the recommendations for the users 80 in the viewing area of the media device 62-1 (i.e., the viewer group), the local recommendation engine 98 identifies one or more video series that: (1) have historically been viewed by at least a first predefined minimum threshold number of users in the viewer group and (2) have at least one series item directly or indirectly available to the media device 62-1 that has not yet been viewed by any of at least a second predefined minimum threshold number of users in the viewer group. The series items directly available to the media device 62-1 are series items stored in the recorded content repository 86-1 of the media device 62-1 and series items accessible from the on-demand content source(s) 70-1 of the media device 62-1. The series items indirectly available to the media device 62-1 are series items available from the recorded content repositories 86 of the other media devices 62 and series items available from the other media devices 62 from the on-demand content source(s) 70 of the other media devices 62. The first and second predefined minimum threshold numbers of users may be defined as absolute numbers of users (e.g., 3 users) or as percentages (e.g., 50%). Further, the first and second predefined minimum threshold numbers of users may be the same minimum threshold number of users or different threshold numbers of users depending on the particular implementation. As an example, the first predefined minimum threshold number of users may be 100% of the users in the viewer group, and the second predefined minimum threshold number of users may also 100% of the users in the viewer group. As a result, the one or more video series identified for the viewer group are one or more video series that: (1) have historically been viewed by all of the users 80 in the viewer group and (2) have at least one video series item that is directly or indirectly available to the media device 62-1 and has not yet been viewed by any of the users 80 in the viewer group.

In some embodiments, the recommendation process may end here such that the video series items of the one or more video series identified for the viewer group that have not yet been viewed by any of at least the second predefined minimum threshold number of users in the viewer group (also referred to herein as the "unwatched video series items" of the one or more identified video series) are recommended to the users 80 in the viewer group. However, in this embodiment, the local recommendation engine 98 prioritizes the unwatched video series items of the one or more series identified for the viewer group. Each of the unwatched video series items may be assigned relative priorities (e.g., assign "best" video series item a priority of 1, "next best" video series item as priority of 2, etc.). Alternatively, each of the unwatched video series items may be assigned a computed priority value (e.g., a score ranging from 0 to 100). Each of the unwatched video series items is prioritized based on one or more criteria including one or more of the following:

a number of the users 80 in the viewer group that have historically viewed the corresponding video series but have not already viewed the video series item, a number of other users not in the viewer group that have historically viewed the corresponding video series in the viewing areas of the media devices 62 but have not already viewed the video series item, a number of other video series items following the video series item in the corresponding video series that have already been viewed by one or more other users not in the viewer group that have historically viewed the corresponding video series in the viewing areas of the media devices 62, a number of other video series items following the video series item in the corresponding video series that have already been viewed by all other users not in the viewer group that have historically viewed the corresponding video series in the viewing areas of the media devices 62, a number of other video series items preceding the video series item in the corresponding video series that have not already been viewed by one or more other users not in the viewer group that have historically viewed the corresponding video series in the viewing areas of the media device 62, and a number of other video series items preceding the video series item in the corresponding video series that have not already been viewed by any other user not in the viewer group that have historically viewed the corresponding video series in the viewing areas of the media devices 62.

For example, in one embodiment, each of the unwatched video series items may be assigned a priority score in the range of 0 to 100 computed as:

$$\text{score} = \frac{\left(\frac{NumViewers_{NW}}{TotalViewers} + \frac{NumOthers_{NW}}{TotalOthers} + \frac{NumFollowing_{AllOthers}}{TotalFollowing} + \frac{NumPreceding_{AllOthers}}{TotalPreceding}\right)}{4} \times 100$$

where $NumViewers_{NW}$ is the number of the users 80 in the viewer group that have not already watched, or viewed, the video series item, TotalViewers is the total number of users in the viewer group, $NumOthers_{NW}$ is the number of other users not in the viewer group that have historically viewed the corresponding video series in the viewing areas of the media devices 62 but have not already viewed the video series item, TotalOthers is the total number of other users not in the viewer group that have historically viewed the corresponding video series in the viewing areas of the media devices 62, $NumFollowing_{AllOthers}$ is the number of video series items in the corresponding video series that follow the video series item in the video series and are directly or indirectly available to the media device 62-1 and that have not already been viewed by all other users not in the viewing group that have historically viewed the corresponding video series in the viewing areas of the media devices 62, TotalFollowing is the total number of video series items in the corresponding video series that follow the video series item in the video series and are directly or indirectly available to the media device 62-1, $NumPreceding_{AllOthers}$ is the number of video series items in the corresponding video series that precede the video series item in the video series and are directly or indirectly available to the media device 62-1 and that have already been viewed by all other users that have historically viewed the corresponding video series in the viewing areas of the media devices 62, and TotalPreceding is the total number of video series items in the corresponding video series that precede the video series item in the video series and are directly or indirectly available to the media device 62-1. It should be noted that while the exemplary equation above uses a straight average, a weighted average may alternatively be used such that the different criteria are weighted differently. For instance, the first criteria in the equation above may be deemed to be the most important and therefore assigned a high weight, whereas the second criteria may be deemed to be least important and therefore assigned a low weight.

In one embodiment, the local recommendation engine 98 then returns video series item recommendations for all of the unwatched video series items where the video series item recommendations include the priorities of the unwatched video series items or otherwise reflect the priorities of the unwatched video series items. In another embodiment, the local recommendation engine 98 returns video series item recommendations only for those unwatched video series items having priorities that are greater than a predefined priority threshold. For example, if the unwatched video series items are assigned priority scores in the range of 0 to 100, the local recommendation engine 98 may return video series item recommendations only for those unwatched video series items that are scored greater than a predefined minimum threshold score such as, for example, 50.

In this embodiment, the local recommendation engine 98 may also generate and provide additional recommendations for the users 80 in the viewer group for non-series video items. More specifically, the local recommendation engine 98 may utilize the personal viewing histories of the users 80 in the viewer group as well as the merged guide 92 to generate additional recommendations for the users 80. For example, the local recommendation engine 98 may process the personal viewing histories of the users 80 to determine aggregate preferences of the viewer group and then select one or more non-series video items to recommend based on comparisons of the aggregate preferences of the viewer group and metadata describing non-series video items in the merged guide 92.

Before proceeding, it should be noted that as part of the recommendation process, the local recommendation engine 98 may also identify additional users that can be invited to join the viewing group in order to increase the priority of one or more of the unwatched video series item recommendations. For example, for a video series item recommendation for an unwatched video series item that has not been watched by two other users that historically have viewed the corresponding video series in the viewing areas of the media devices 62, the local recommendation engine 98 may determine that the priority of the unwatched video series item and thus the video series item recommendation may be increased if the two other users join the viewing group. The local recommendation engine 98 may then invite the two other users to join the viewer group using any suitable messaging scheme such as, for example, sending a text message to mobile devices of the other two users using stored mobile telephone numbers of those users, sending email messages to the other two users using stored email addresses of the two users, sending instant messages to the users using stored usernames of the two users, sending messages to the mobile devices of the two other users if connected to the LAN 66, or the like. The two other users may be invited automatically or after obtaining approval from one or more of the users 80 in the viewer group. In addition or alternatively, the local recommendation engine 98 may notify the users 80 of the two other users that it recommends inviting to the viewer group.

After generating the recommendations, the local recommendation engine 98 of the media broker 64 returns the recommendations to the media device 62-1 (step 1508). The playback and recording function 84-1 of the media device 62-1 then presents the recommendations to the users 80 via the display device 72-1 (step 1510). In response, in this embodiment, the media device 62-1 receives a selection of one of the recommendations from one of the users 80 (step 1512). The selection may be received, for example, via a remote control or other user interface component of the media device 62-1. Upon receiving the selection, the playback and recording function 84-1 of the media device 62-1 sends a request for the selected video item (i.e., the media item identified by the selected video item recommendation) to the media broker 64 (step 1514). The media broker 64 then identifies one of the media devices 62 that has access to the requested video item as the media device 62 to serve the request (step 1516). In this example, the media device 62-M is identified as the media device to serve the request. The media broker 64 then sends a response to the media device 62-1 that includes information, such as an Internet Protocol (IP) address, for the media device 62-M (step 1518). Upon receiving the response, the playback and recording function 84-1 of the media device 62-1 sends a request for the video item to the media device 62-M via the LAN 66 (step 1520). In response, the playback and recording function 84-M of the media device 62-M streams the video item to the media device 62-1 via the LAN 66 (step 1522). The playback and recording function 84-1 of the media device 62-1 plays the video item as the stream is received such that the video item is rendered via the corresponding display device 72-1 (step 1524).

Figure 11:
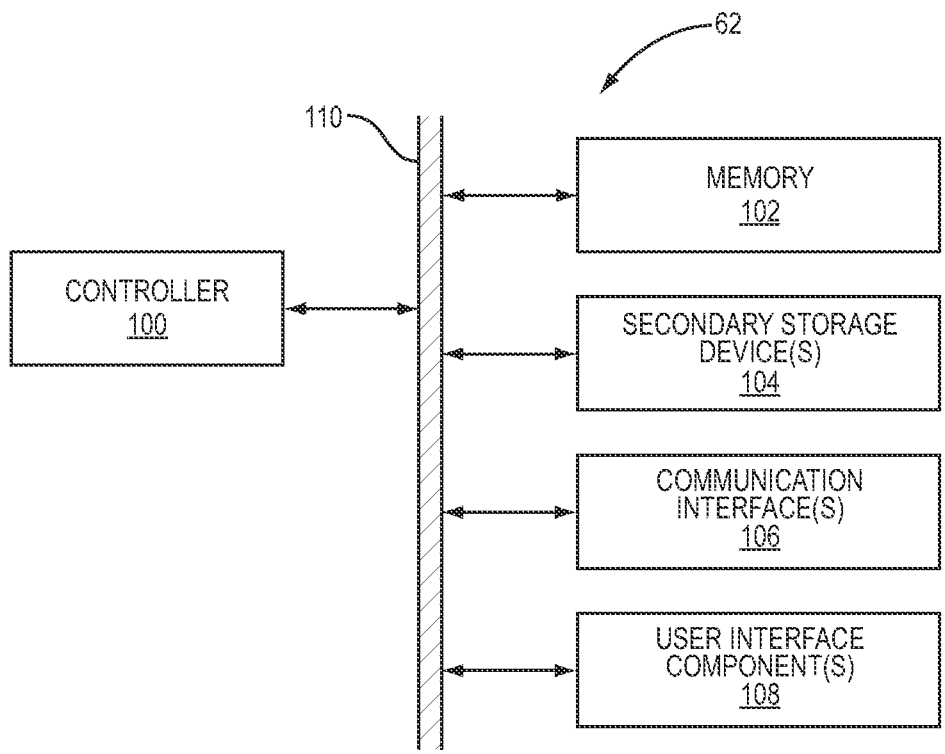
FIG. 11 is a block diagram of one of the media devices of FIG. 9 according to one embodiment of the present disclosure.

FIG. 11 is a block diagram of one of the media devices 62 of FIG. 9 according to one embodiment of the present disclosure. As illustrated, the media device 62 includes a controller 100 connected to memory 102, one or more secondary storage devices 104, one or more communication interfaces 106, and one or more user interface components 108 by a bus 110 or similar mechanism. The controller 100 is one or more microprocessors, one or more digital ASICs, one or more FPGAs, or similar hardware controller, or any combination thereof. The playback and recording function 84 and the user detection function 88 are each implemented as hardware components within the controller 100, software components stored in the memory 102 and executed by the controller 100, or a combination thereof. The one or more secondary storage devices 104 are digital storage devices such as, for example, one or more hard disk drives, one or more FLASH memory components, or the like. The recorded content repository 86 of the media device 62 is implemented in the one or more secondary storage devices 104. The one or more communication interfaces 106 include one or more wired and/or wireless communication interfaces by which the media device 62 receives content from the broadcast content source(s) 68, requests and receives on-demand content from the on-demand content source(s) 70, and connects to the LAN 66. For example, the one or more communication interfaces 106 may include a cable network interface (e.g., a cable card), an Ethernet interface, a local wireless interface (e.g., an IEEE 802.11x interface), or the like. The one or more user interface components 108 may include, for example, an IR receiver for receiving user input via an associated remote control, one or more user input components (e.g., buttons or a keypad), a display, a speaker, or the like, or any combination thereof.

Figure 12:
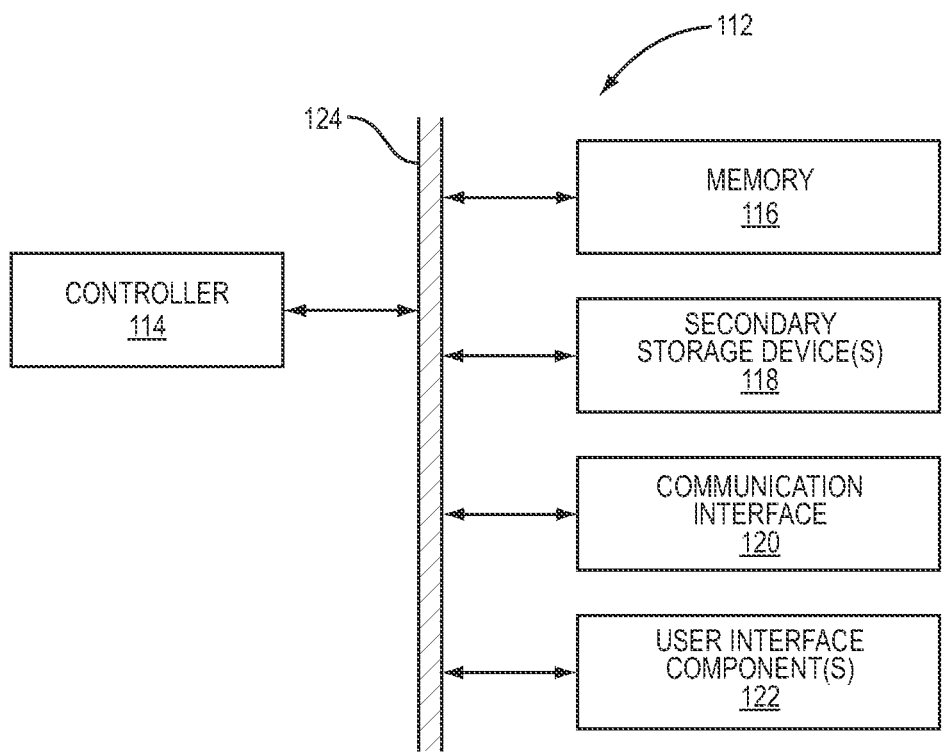
FIG. 12 is a block diagram of a computing device that hosts the media broker of FIG. 10 according to one embodiment of the present disclosure.

FIG. 12 is a block diagram of a computing device 112 hosting the media broker 64 of FIG. 9 according to one embodiment of the present disclosure. As illustrated, the computing device 112 includes a controller 114 connected to memory 116, one or more secondary storage devices 118, a communication interface 120, and one or more user interface components 122 by a bus 124 or similar mechanism. The controller 114 is a microprocessor, digital ASIC, FPGA, or similar hardware controller. In this embodiment, the controller 114 is a microprocessor, and the aggregator 90, the history tracking function 94, and the local recommendation engine 98 are implemented in software and stored in the memory 116 for execution by the controller 114. The one or more secondary storage devices 118 are digital storage devices such as, for example, one or more hard disk drives, one or more FLASH memory components, or the like. In this embodiment, the merged guide 92 and the personal viewing history repository 96 are implemented or stored in the one or more secondary storage devices 118. The communication interface 120 is a wired or wireless communication interface that communicatively couples the computing device 112 to the LAN 66. The one or more user interface components 122 include, for example, a touchscreen, a display, one or more user input components (e.g., a keypad), a speaker, or the like, or any combination thereof.

In order to help illustrate some aspects of the present disclosure described above, the following exemplary use cases are provided. However, these use cases are exemplary and are not to be construed as limiting the present disclosure. Further, not all aspects of the present disclosure are illustrated in these exemplary use cases.

Figure 13:
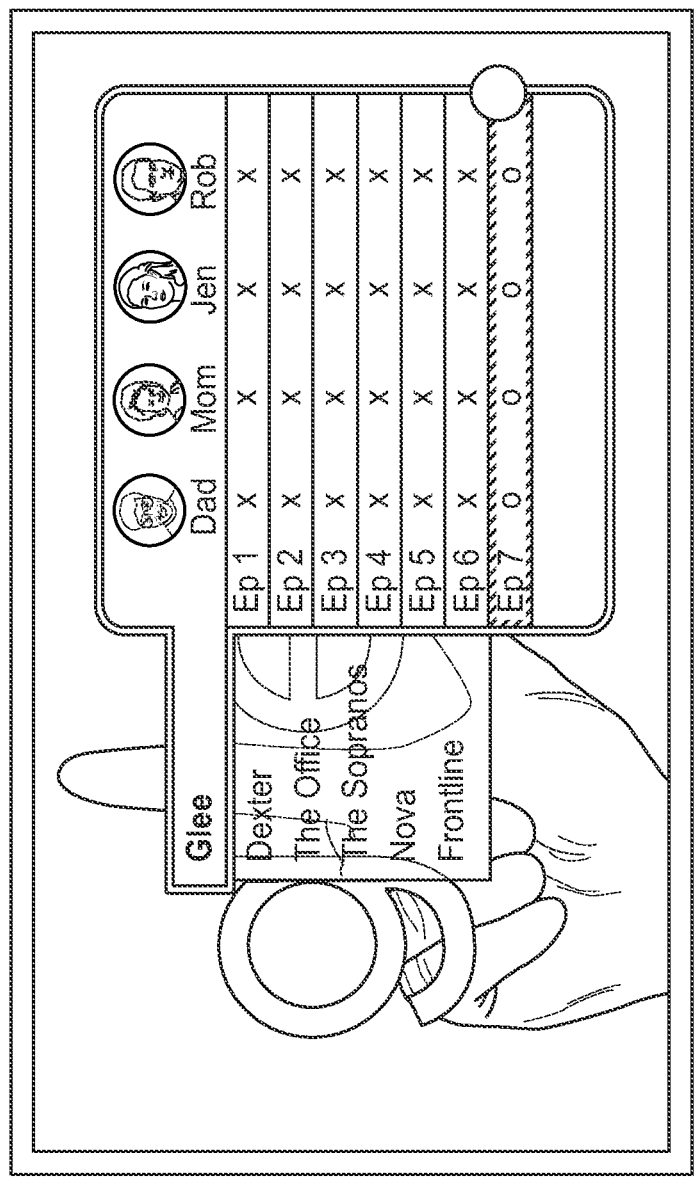
FIG. 13 illustrates an exemplary Graphical User Interface (GUI) for presenting video series item recommendations to a viewer group according to one embodiment of the present disclosure.

Use Case 1: Family Sits Down for Weekly Watching
1. The Johnson family (Dad, Mom, Jen, and Rob) sits down together to watch TV on a Tuesday night.
2. Dad turns on the TV and the enhanced media device 10/62 that they've been using.
3. The media device 10/62 determines that the whole family is in the room and determines what TV series they have all been watching and where they are in watching in relation to one another.
4. A hierarchical list of video series item recommendations is generated and presented to the family as illustrated in FIG. 13. At the top of the list is the television series Glee.
5. Glee was on last night and all of the members of the family have seen all of the previous episodes of this series, but none have seen the most recent episode, which is episode 7.
6. The system suggests to the family that they watch episode 7 of Glee together.
7. The family agrees and Dad selects to watch the seventh episode of Glee.
8. Playback begins.

Use Case 2: Jon watching TV alone
1. Jon sits down to watch TV alone since the family is all out for the day. He turns on the TV and the enhanced DVR (media device 10) that his dad bought a few months ago.
2. Jon is currently ahead of the family in watching Greek and Gilmore Girls but behind on 8 Simple Rules. Recommendations are presented to Jon for the two episodes of 8 Simple Rules that he has yet to watch in order for Jon to catch up with his family.
3. Jon thinks this is a great idea, and he selects the first of the two recommendations for playback.
4. Playback begins.

Use Case 3: Daniel and Allison Getting Ahead of Themselves
1. Daniel sits down to watch TV with his sister Allison while the parents are cooking dinner.
2. Daniel turns on the TV and new enhanced DVR (media device 10).
3. The DVR determines both Allison and Daniel are in the room.
4. The DVR determines that there are three series that Allison and Daniel are at the same point in watching. In one of those series, they are both ahead of their parents in the series. There is one new episode of that series recorded. As such, the DVR recommends the one new episode with a low priority.
5. Since that new show is Daniel and Allison's favorite, they select that series for playback.
6. The next time Mom and Dad sit down to watch movies the DVR recommends that series for them to watch together alone.

Those skilled in the art will recognize improvements and modifications to the preferred embodiments of the present disclosure. All such improvements and modifications are considered within the scope of the concepts disclosed herein and the claims that follow.

What is claimed is:

1. A computer-implemented method comprising:
generating one or more video series item recommendations for a viewer group that includes a plurality of users detected in a viewing area of a media device based on personal viewing histories of the plurality of users in the viewer group, the one or more video series item recommendations being recommendations for one or more video series items that: (a) are from one or more video series that have historically been viewed by at least a first predefined minimum threshold number of users in the viewer group and (b) have not yet been viewed by any of at least a second predefined minimum threshold number of users in the viewer group; and
providing the one or more video series item recommendations to the viewer group.

2. The method of claim 1 wherein the one or more video series item recommendations comprise one or more video series item recommendations for one or more video series items stored by the media device.

3. The method of claim 1 wherein the one or more video series item recommendations comprise one or more video series item recommendations for one or more video series items recorded by the media device.

4. The method of claim 1 wherein the one or more video series item recommendations comprise one or more video series item recommendations for one or more on-demand video series items available to the media device from one or more on-demand content sources.

5. The method of claim 1 wherein the media device is located at a user premises and is connected to one or more other media devices located at the user premises via a Local Area Network (LAN), and the one or more video series item recommendations comprise one or more video series item recommendations for one or more video series items stored by at least one of the one or more other media devices that are accessible to the media device from the at least one of the one or more other media devices via the LAN.

6. The method of claim 1 wherein the media device is located at a user premises and is connected to one or more other media devices located at the user premises via a Local Area Network (LAN), and the one or more video series item recommendations comprise one or more video series item recommendations for one or more video series items recorded by at least one of the one or more other media devices that are accessible to the media device from the at least one of the one or more other media devices via the LAN.

7. The method of claim 1 wherein the media device is located at a user premises and is connected to one or more other media devices located at the user premises via a Local Area Network (LAN), and the one or more video series item recommendations comprise one or more video series item recommendations for one or more on-demand video series items that are available to at least one of the one or more other media devices from one or more on-demand content sources and are accessible to the media device from the at least one of the one or more other media devices via the LAN.

8. The method of claim 1 wherein generating the one or more video series item recommendations comprises generating the one or more video series item recommendations in such a manner that the one or more video series item recommendations comprise a video series item recommendation for a video series item in a video series for which the viewer group is falling behind one or more other users that have historically viewed the video series in the viewing area of the media device.

9. The method of claim 1 wherein the media device is located at a user premises and is connected to one or more other media devices located at the user premises via a Local Area Network (LAN), and generating the one or more video series item recommendations comprises generating the one or more video series item recommendations in such a manner that the one or more video series item recommendations comprise a video series item recommendation for a video series item in a video series for which the viewer group is falling behind one or more other users that have historically viewed the video series at the user premises.

10. The method of claim 1 wherein generating the one or more video series item recommendations comprises:
identifying, based on the personal viewing histories of the plurality of users in the viewer group, one or more video series that have historically been viewed by at least the first predefined minimum threshold number of users in the viewer group; and
identifying one or more video series items in the one or more video series that are available to the media device and have not yet been viewed by any of at least the second predefined minimum threshold number of users in the viewer group;
wherein the one or more video series item recommendations are recommendations for at least a subset of the one or more video series items in the one or more video series that are available to the media device and have not yet been viewed by any of at least the second predefined minimum threshold number of users in the viewer group.

11. The method of claim 10 wherein the at least a subset of the one or more video series items is all of the one or more video series items in the one or more video series that are available to the media device and have not yet been viewed by any of at least the second predefined minimum threshold number of users in the viewer group.

12. The method of claim 10 wherein the at least a subset of the one or more video series items is a select subset of the one or more video series items in the one or more video series that are available to the media device and have not yet been viewed by any of at least the second predefined minimum threshold number of users in the viewer group.

13. The method of claim 10 wherein generating the one or more video series item recommendations further comprises prioritizing the one or more video series items in the one or more video series that are available to the media device and have not yet been viewed by any of at least the second predefined minimum threshold number of users in the viewer group.

14. The method of claim 13 wherein one or more video series item recommendations reflect priorities of the one or more video series items.

15. The method of claim 13 wherein generating the one or more video series item recommendations further comprises selecting a subset of the one or more video series items in the one or more video series that are available to the media device and have not yet been viewed by any of at least the second predefined minimum threshold number of users in the viewer group having priorities greater than a predefined threshold priority as one or more video series items to be recommended via the one or more video series item recommendations.

16. The method of claim 13 wherein prioritizing the one or more video series items in the one or more video series that are available to the media device and have not yet been viewed by any of at least the second predefined minimum threshold number of users in the viewer group comprises prioritizing each video series item of the one or more video series items in the one or more video series that are available to the media device and have not yet been viewed by any of at least the second predefined minimum threshold number of users in the viewer group based on a number of the plurality of users in the viewer group that have historically viewed a corresponding video series but have not already viewed the video series item.

17. The method of claim 13 wherein prioritizing the one or more video series items in the one or more video series that are available to the media device and have not yet been viewed by any of at least the second predefined minimum threshold number of users in the viewer group comprises prioritizing each video series item of the one or more video series items in the one or more video series that are available to the media device and have not yet been viewed by any of at least the second predefined minimum threshold number of users in the viewer group based on a number of other users not in the viewer group that have historically viewed a corresponding video series in the viewing area of the media device but have not already viewed the video series item.

18. The method of claim 13 wherein the media device is located at a user premises and is connected to one or more other media devices located at the user premises via a Local Area Network (LAN), and prioritizing the one or more video series items in the one or more video series that are available to the media device and have not yet been viewed by any of at least the second predefined minimum threshold number of users in the viewer group comprises prioritizing each video series item of the one or more video series items in the one or more video series that are available to the media device and have not yet been viewed by any of at least the second predefined minimum threshold number of users in the viewer group based on a number of other users not in the viewer group that have historically viewed a corresponding video series at the user premises but have not already viewed the video series item.

19. The method of claim 13 wherein prioritizing the one or more video series items in the one or more video series that are available to the media device and have not yet been viewed by any of at least the second predefined minimum threshold number of users in the viewer group comprises prioritizing each video series item of the one or more video series items in the one or more video series that are available to the media device and have not yet been viewed by any of at least the second predefined minimum threshold number of users in the viewer group based on a number of other video series items following the video series item in a corresponding video series that have already been viewed by one or more other users not in the viewer group that have historically viewed the corresponding video series in the viewing area of the media device.

20. The method of claim 13 wherein the media device is located at a user premises and is connected to one or more other media devices located at the user premises via a Local Area Network (LAN), and prioritizing the one or more video series items in the one or more video series that are available to the media device and have not yet been viewed by any of at least the second predefined minimum threshold number of users in the viewer group comprises prioritizing each video series item of the one or more video series items in the one or more video series that are available to the media device and have not yet been viewed by any of at least the second predefined minimum threshold number of users in the viewer group based on a number of other video series items following the video series item in a corresponding video series that have already been viewed by one or more other users not in the viewer group that have historically viewed the corresponding video series at the user premises.

21. The method of claim 13 wherein prioritizing the one or more video series items in the one or more video series that are available to the media device and have not yet been viewed by any of at least the second predefined minimum threshold number of users in the viewer group comprises prioritizing each video series item of the one or more video series items in the one or more video series that are available to the media device and have not yet been viewed by any of at least the second predefined minimum threshold number of users in the viewer group based on a number of other video series items following the video series item in a corresponding video series that have already been viewed by all other users not in the viewer group that have historically viewed the corresponding video series in the viewing area of the media device.

22. The method of claim 13 wherein the media device is located at a user premises and is connected to one or more other media devices located at the user premises via a Local Area Network (LAN), and prioritizing the one or more video series items in the one or more video series that are available to the media device and have not yet been viewed by any of at least the second predefined minimum threshold number of users in the viewer group comprises prioritizing each video series item of the one or more video series items in the one or more video series that are available to the media device and have not yet been viewed by any of at least the second predefined minimum threshold number of users in the viewer group based on a number of other video series items following the video series item in a corresponding video series that have already been viewed by all other users not in the viewer group that have historically viewed the corresponding video series at the user premises.

23. The method of claim 13 wherein prioritizing the one or more video series items in the one or more video series that are available to the media device and have not yet been viewed by any of at least the second predefined minimum threshold number of users in the viewer group comprises prioritizing each video series item of the one or more video series items in the one or more video series that are available to the media device and have not yet been viewed by any of at least the second predefined minimum threshold number of users in the viewer group based on a number of other video series items preceding the video series item in a corresponding video series that have not already been viewed by one or more other users not in the viewer group that have historically viewed the corresponding video series in the viewing area of the media device.

24. The method of claim 13 wherein the media device is located at a user premises and is connected to one or more other media devices located at the user premises via a Local Area Network (LAN), and prioritizing the one or more video series items in the one or more video series that are available to the media device and have not yet been viewed by any of at least the second predefined minimum threshold number of users in the viewer group comprises prioritizing each video series item of the one or more video series items in the one or more video series that are available to the media device and have not yet been viewed by any of at least the second predefined minimum threshold number of users in the viewer group based on a number of other video series items preceding the video series item in a corresponding video series that have not already been viewed by one or more other users not in the viewer group that have historically viewed the corresponding video series at the user premises.

25. The method of claim 13 wherein prioritizing the one or more video series items in the one or more video series that are available to the media device and have not yet been viewed by any of at least the second predefined minimum threshold number of users in the viewer group comprises prioritizing each video series item of the one or more video series items in the one or more video series that are available to the media device and have not yet been viewed by any of at least the second predefined minimum threshold number of users in the viewer group based on a number of other video series items preceding the video series item in a corresponding video series that have not already been viewed by all other users not in the viewer group that have historically viewed the corresponding video series in the viewing area of the media device.

26. The method of claim 13 wherein the media device is located at a user premises and is connected to one or more other media devices located at the user premises via a Local Area Network (LAN), and prioritizing the one or more video series items in the one or more video series that are available to the media device and have not yet been viewed by any of at least the second predefined minimum threshold number of users in the viewer group comprises prioritizing each video series item of the one or more video series items in the one or more video series that are available to the media device and have not yet been viewed by any of at least the second predefined minimum threshold number of users in the viewer group based on a number of other video series items preceding the video series item in a corresponding video series that have not already been viewed by all other users not in the viewer group that have historically viewed the corresponding video series at the user premises.

27. The method of claim 13 further comprising identifying one or more other users that can be invited to join the viewer group in order to increase a priority of at least one of the one or more video series items recommended by the one or more video series item recommendations.

28. The method of claim 1 wherein generating the one or more video series item recommendations comprises:
sending a recommendation request to a remote recommendation engine associated with one or more on-demand content sources; and
in response to the recommendation request, receiving at least one of the one or more video series item recommendations from the remote recommendation engine.

29. The method of claim 1 wherein generating the one or more video series item recommendations comprises generating the one or more video series item recommendations based on the personal viewing histories of the plurality of users in the viewer group and personal viewing histories of one or more other users that are not in the viewer group but have historically viewed video content in the viewing area of the media device.

30. The method of claim 1 wherein the media device is located at a user premises and is connected to one or more other media devices located at the user premises via a Local Area Network (LAN), and generating the one or more video series item recommendations comprises generating the one or more video series item recommendations based on the personal viewing histories of the plurality of users in the viewer group and personal viewing histories of one or more other users that are not in the viewer group but have historically viewed video content at the user premises.

31. The method of claim 1 wherein generating the one or more video series item recommendations comprises generating the one or more video series item recommendations at the media device, and the method further comprises presenting the one or more video series item recommendations to the viewer group.

32. The method of claim 1 wherein the media device is located at a user premises and is connected to one or more other media devices located at the user premises via a Local Area Network (LAN), generating the one or more video series items comprises generating the one or more video series item recommendations at a computing device located at the user premises and connected to the LAN, and providing the one or more video series item recommendations to the viewer group comprises sending the one or more video series item recommendations from the computing device to the media device via the LAN for presentation to the viewer group.

33. The method of claim 1 further comprising identifying one or more other users that can be invited to join the viewer group in order to result in different video series item recommendations.

34. A computing device comprising:
one or more communication interfaces; and
a controller associated with the one or more communication interfaces, and adapted to:
generate one or more video series item recommendations for a viewer group that include a plurality of users detected in a viewing area of a media device based on personal viewing histories of the plurality of users in the viewer group, the one or more video series item recommendations being recommendations for one or more video series items that: (a) are from one or more video series that have historically been viewed by at least a first predefined minimum threshold number of users in the viewer group and (b) have not yet been viewed by any of at least a second predefined minimum threshold number of users in the viewer group; and
provide the one or more video series item recommendations to the viewer group.

35. The computing device of claim 34 wherein the computing device is the media device.

36. The computing device of claim 34 wherein the media device is located at a user premises and is connected to one or more other media devices located at the user premises via a Local Area Network (LAN), and the computing device is a computing device located at the user premises and connected to the LAN.

37. A non-transitory computer readable medium storing software for instructing a controller of a computing device to:
generate one or more video series item recommendations for a viewer group that includes a plurality of users detected in a viewing area of a media device based on personal viewing histories of the plurality of users in the viewer group, the one or more video series item recommendations being recommendations for one or more video series items that: (a) are from one or more video series that have historically been viewed by at least a first predefined minimum threshold number of users in the viewer group and (b) have not yet been viewed by any of at least a second predefined minimum threshold number of users in the viewer group; and
provide the one or more video series item recommendations to the viewer group.

38. The computer readable medium of claim 37 wherein the computing device is the media device.

39. The computer readable medium of claim 37 wherein the media device is located at a user premises and is connected to one or more other media devices located at the user premises via a Local Area Network (LAN), and the computing device is a computing device located at the user premises and connected to the LAN.

* * * * *